US012436718B2

United States Patent
Nagai

(10) Patent No.: US 12,436,718 B2
(45) Date of Patent: Oct. 7, 2025

(54) MEMORY SYSTEM

(71) Applicant: Kioxia Corporation, Tokyo (JP)

(72) Inventor: Koichi Nagai, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/741,982

(22) Filed: Jun. 13, 2024

(65) Prior Publication Data

US 2024/0419359 A1    Dec. 19, 2024

(30) Foreign Application Priority Data

Jun. 16, 2023   (JP) .................................. 2023-099308

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/061

USPC .................................................. 711/154, 100
See application file for complete search history.

(56) References Cited

U.S. PATENT DOCUMENTS

| 10,860,511 | B1 | 12/2020 | Thompson et al. |
| 2015/0277802 | A1* | 10/2015 | Oikarinen ............. G06F 3/0689 711/114 |
| 2022/0113909 | A1 | 4/2022 | Shin et al. |
| 2022/0350536 | A1 | 11/2022 | Chou et al. |

* cited by examiner

*Primary Examiner* — Hosain T Alam
*Assistant Examiner* — Zubair Ahmed
(74) *Attorney, Agent, or Firm* — Oblon, McClelland, Maier &Neustadt, L.L.P.

(57) ABSTRACT

According to one embodiment, a controller of a memory system manages a current extended pointer that includes a pointer and cycle counter. The controller identifies, for each time the first time elapses, a first time range whose an end time matches a time that is prior to a specific time from a current time. The controller acquires a first extended pointer stored in a first entry among the plurality of entries that corresponds to the first time range. The controller identifies one or more commands stored in the first queue within the first time range by using the first extended pointer. The controller aborts the identified one or more commands.

14 Claims, 22 Drawing Sheets

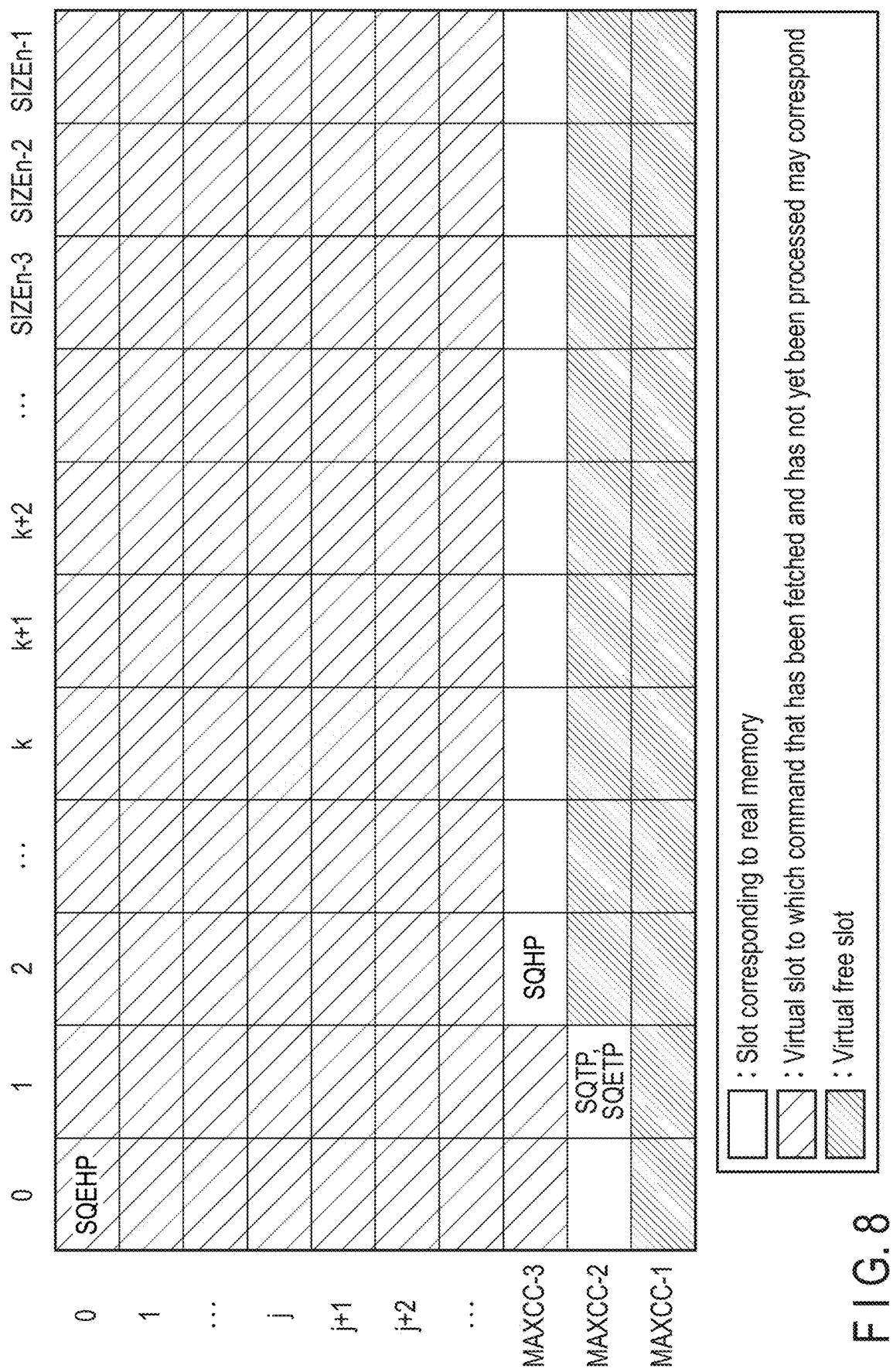
F I G. 8

Fetch command management table

| | Contents of submission queue entry | Extended pointer |
|---|---|---|
| 0 | | |
| 1 | | |
| 2 | | |
| ... | | |
| MAXFN-3 | | |
| MAXFN-2 | | |
| MAXFN-1 | | |

FIG. 12

Time slot management table

| Line number | Extended pointer |
|---|---|
| 0 | |
| 1 | |
| 2 | |
| 3 | |
| 4 | |
| ... | |
| Mn-1 | |
| Mn | |

FIG. 13

Time slot management table

| Line number | Extended pointer (time=t×Tn) |
|---|---|
| 0 | SQETP at t=S-2. Corresponds to time slot TSn, S-2 |
| 1 | SQETP at t=S-1. Corresponds to time slot TSn, S-1 |
| 2 | SQETP at t=S. Corresponds to latest time slot TSn, S |
| 3 | SQETP at t=S-Mn. Corresponds to time slot TSn, S-Mn of timeout target |
| 4 | SQETP at t=S-Mn+1. Corresponds to time slot TSn, S-Mn+1 |
| ... | |
| Mn-1 | SQETP at t=S-4. Corresponds to time slot TSn, S-4 |
| Mn | SQETP at t=S-3. Corresponds to time slot TSn, S-3 |

F I G. 14

Time slot management table

| Line number | Extended pointer (time=t×Tn) |
|---|---|
| 0 | SQETP at t=S-2. Corresponds to time slot TSn, S-2. Value is X. |
| 1 | SQETP at t=S-1. Corresponds to time slot TSn, S-1. Value is X. |
| 2 | Before update, corresponds to time slot TSn, S-(Mn+1), and X-1 which is SQETP at t=S-(Mn+1) is stored.<br>After update, corresponds to time slot TSn, S, and X which is SQETP at t=S is stored. |
| 3 | SQETP at t=S-Mn. Corresponds to time slot TSn, S-Mn of timeout target. Value is X. |
| 4 | SQETP at t=S-(Mn-1). Corresponds to time slot TSn, S-Mn+1. Value is X. |
| ... | All values are X. |
| Mn-1 | SQETP at t=S-4. Corresponds to time slot TSn, S-4. Value is X. |
| Mn | SQETP at t=S-3. Corresponds to time slot TSn, S-3. Value is X. |

F I G. 15

Fetch command management table

| | Contents of submission queue entry | Line number of time slot management table |
|---|---|---|
| 0 | | |
| 1 | | |
| 2 | | |
| ... | | |
| MAXFN-3 | | |
| MAXFN-2 | | |
| MAXFN-1 | | |

FIG. 16

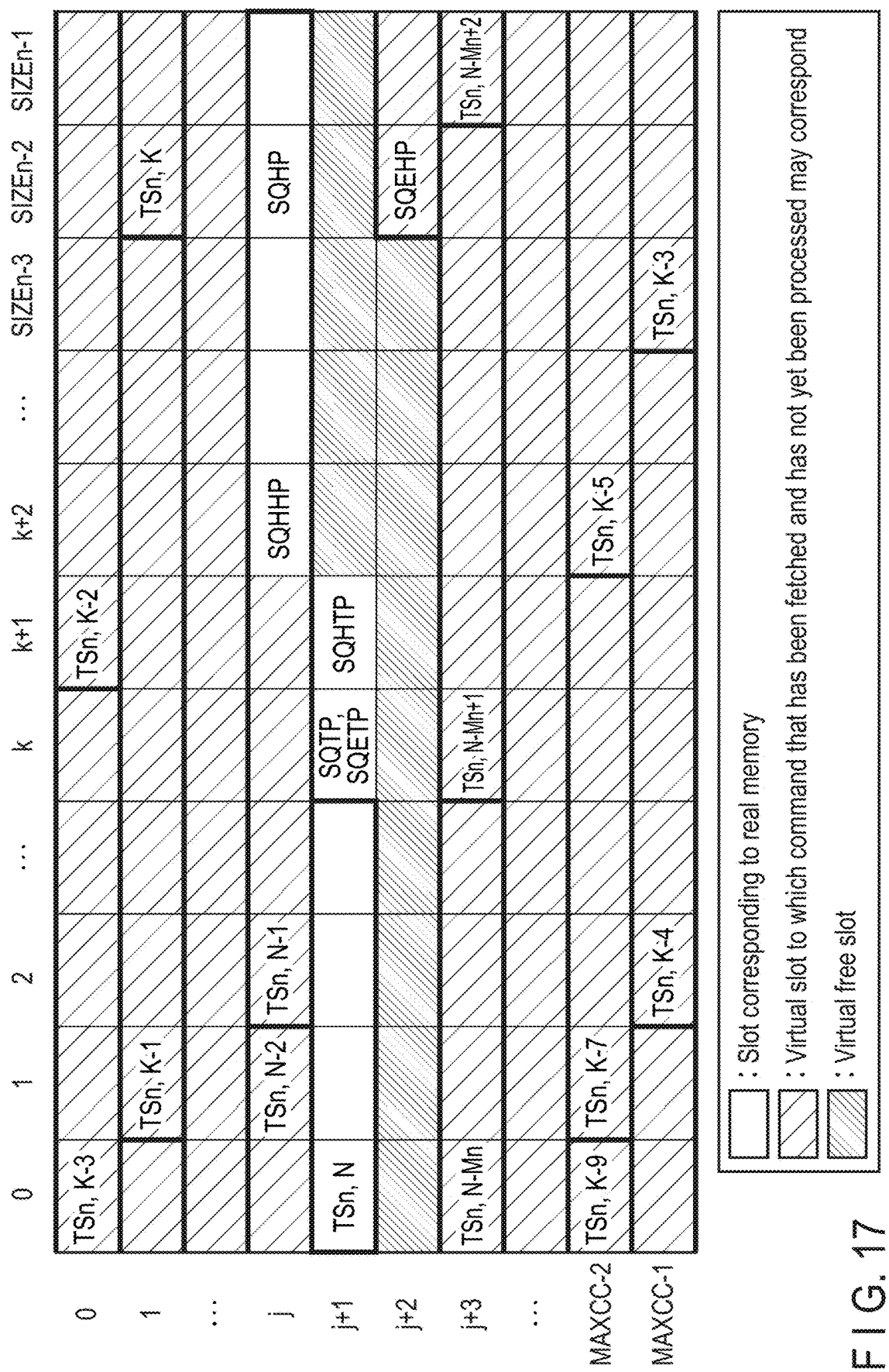
F I G. 17

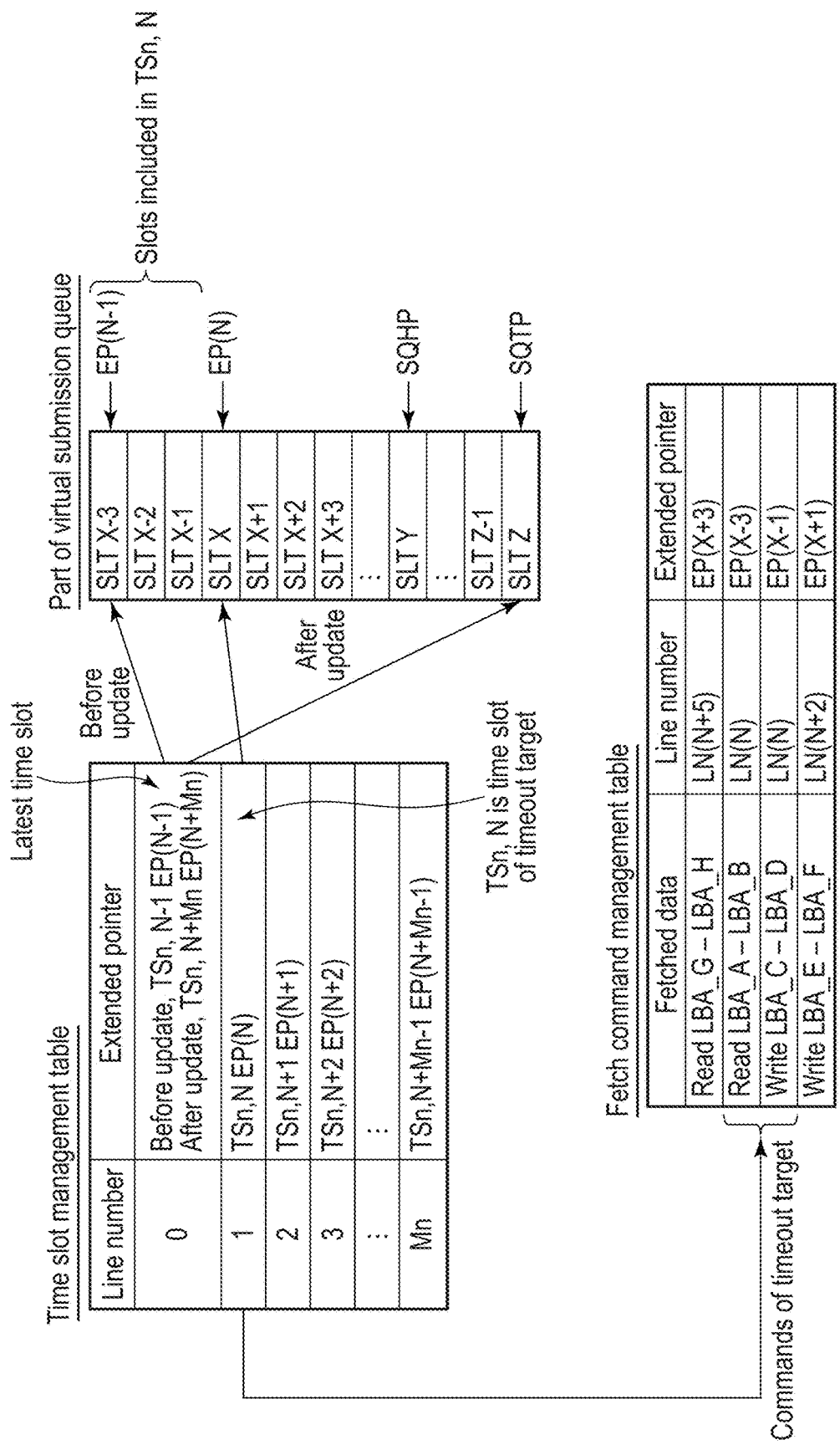
F I G. 18

| Time | 0×Tc | 1×Tc | 2×Tc | 3×Tc | 4×Tc | 5×Tc | 6×Tc | 7×Tc | 8×Tc | 9×Tc | 10×Tc |
|---|---|---|---|---|---|---|---|---|---|---|---|
| SQ0 (T0=2×Tc) | Start | — | Timeout process | — | Timeout process | — | Timeout process | — | Timeout process | — | Timeout process |
| SQ1 (T1=4×Tc) | — | Start | — | — | — | Timeout process | — | — | — | Timeout process | — |

F I G. 19

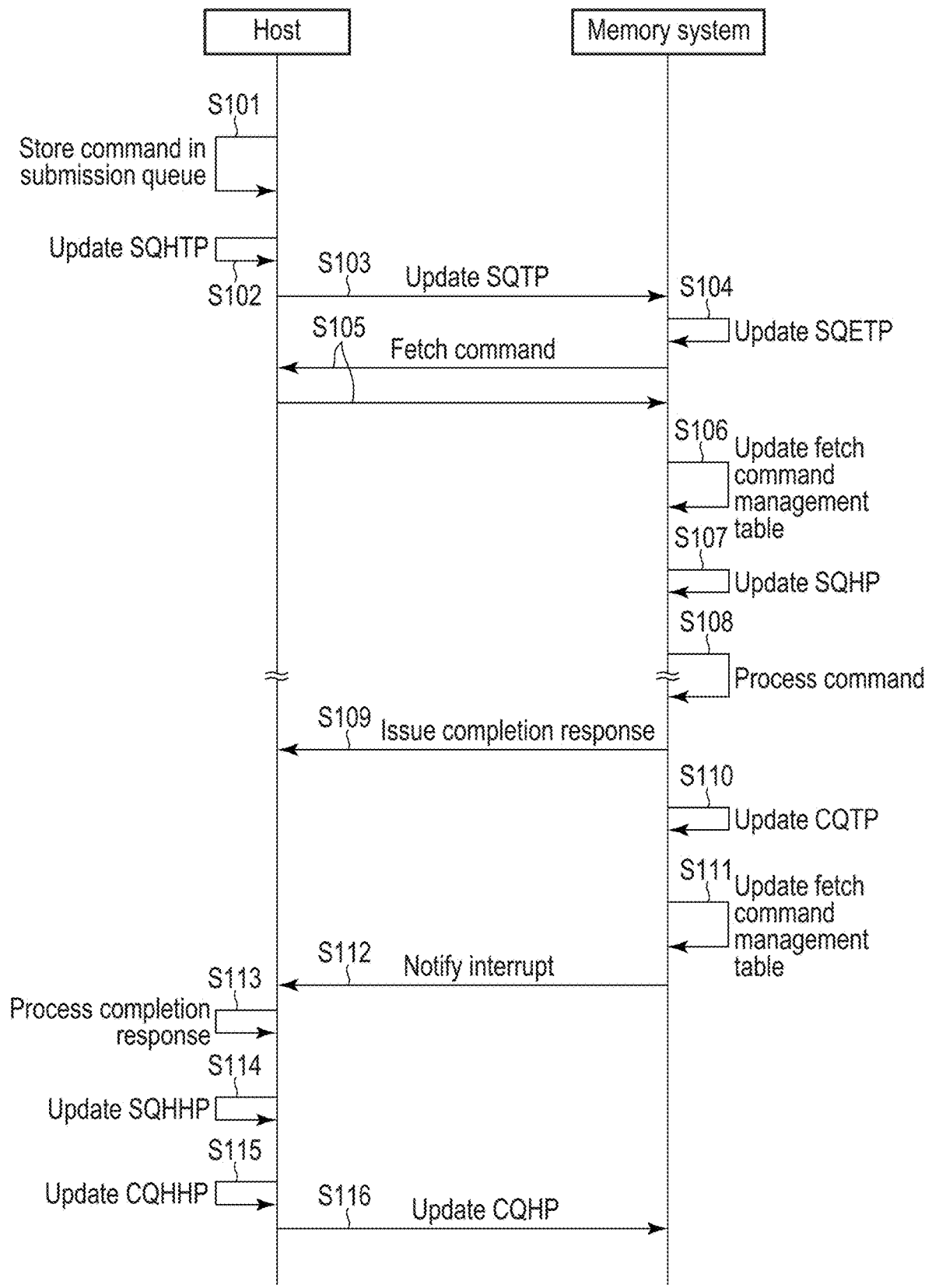
F I G. 20

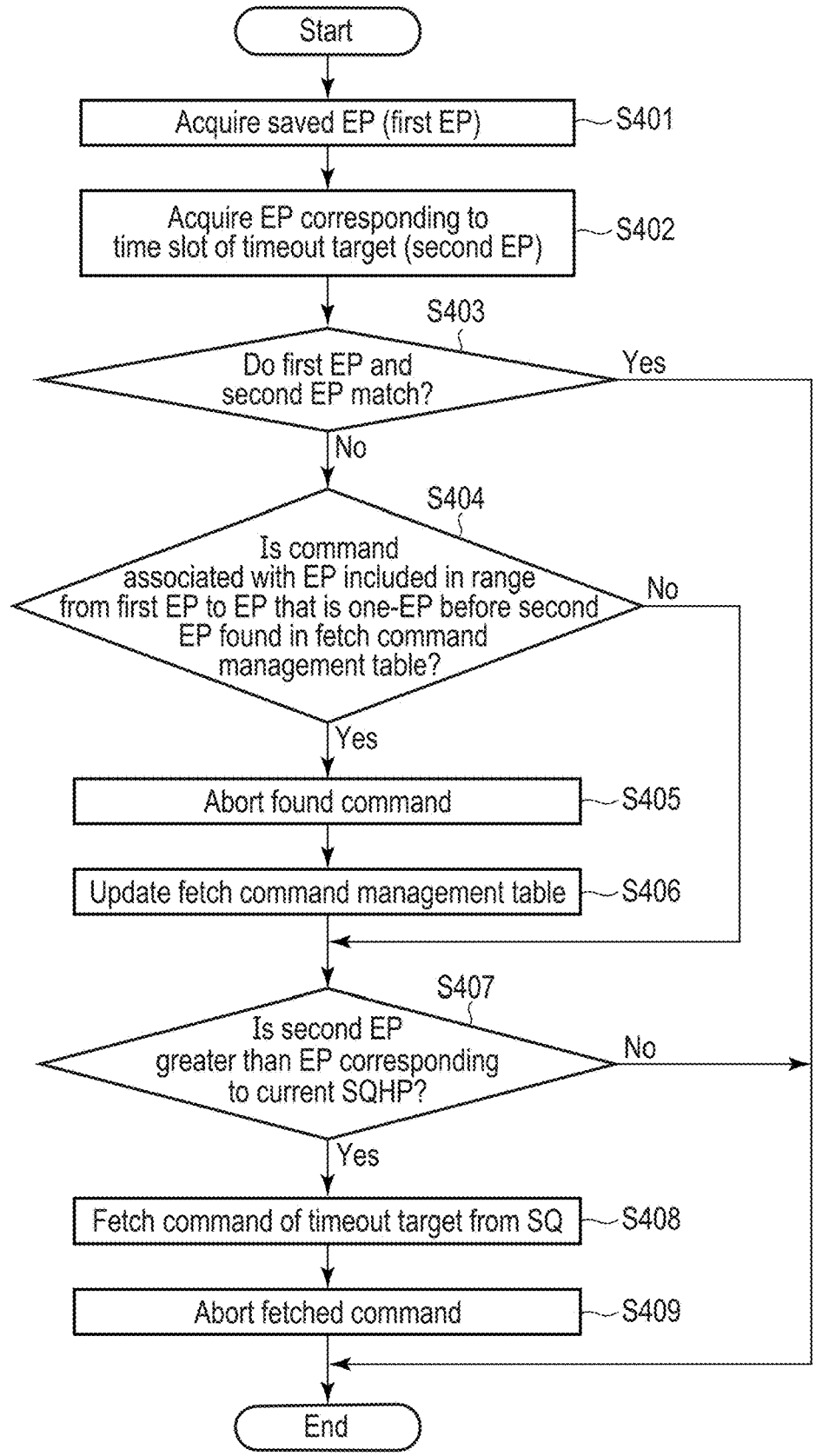
F I G. 23

MEMORY SYSTEM

CROSS-REFERENCE TO RELATED APPLICATIONS

This application is based upon and claims the benefit of priority from Japanese Patent Application No. 2023-099308, filed Jun. 16, 2023, the entire contents of which are incorporated herein by reference.

FIELD

Embodiments described herein relate generally to a memory system including a nonvolatile memory.

BACKGROUND

In recent years, memory systems that include a nonvolatile memory are widely used. As one of such memory systems, a solid state drive (SSD) that includes a nonvolatile memory, such as a NAND flash memory, and a controller that controls the nonvolatile memory is known.

The controller of the memory system controls the memory system, based on a command issued and received from an external host. The memory system executes a timeout process in which a command whose elapsed time since issuance exceeds a specific time is aborted.

In a memory system capable of receiving a large number of commands, there is a need for a technique that can efficiently execute such timeout process.

BRIEF DESCRIPTION OF THE DRAWINGS

FIG. 8 illustrates a third state example of the virtual submission queue managed in the memory system according to the embodiment.

FIG. 12 illustrates an example of a configuration of a fetch command management table used in the memory system according to the embodiment.

FIG. 13 illustrates an example of a configuration of a time slot management table used in the memory system according to the embodiment.

FIG. 14 illustrates a first state example of the time slot management table in which a plurality of extended pointers are stored, in the memory system according to the embodiment.

FIG. 15 illustrates a second state example of the time slot management table in which a plurality of extended pointers are stored, in the memory system according to the embodiment.

FIG. 16 illustrates a modification example of the fetch command management table used in the memory system according to the embodiment.

FIG. 17 illustrates an example of a relationship between the virtual submission queue and a plurality of time slots managed in the memory system according to the embodiment.

FIG. 18 illustrates an example of management of issued commands, in the memory system according to the embodiment.

FIG. 19 illustrates an example of timings of timeout processes, in the memory system according to the embodiment.

FIG. 20 is a sequence diagram illustrating an example of the procedure of a command process executed between the memory system according to the embodiment and a host.

FIG. 23 is a flowchart illustrating a first example of the procedure of the timeout process executed in the memory system according to the embodiment.

DETAILED DESCRIPTION

In general, according to one embodiment, a memory system comprises a memory and a controller. The controller is configured to control the memory. The memory system is connectable to an external host. The controller is capable of executing processes in accordance with commands received from the host through a first queue, the first queue includes a plurality of slots that are capable of storing the received commands. The controller manages a current extended pointer that includes a pointer and a cycle counter, the pointer indicating a current slot among the plurality of slots in which a command is to be stored next, the cycle counter being updated in response to a current value of the pointer being updated with a value smaller than the current value. The controller manages a first table that includes a plurality of entries, each of which corresponds to a time range among a plurality of contiguous time ranges, each of which has a first time as a unit. The controller selects an entry from the plurality of entries for each time the first time elapses. The controller stores, in the selected entry, the current extended pointer. The controller identifies, for each time the first time elapses, a first time range whose an end time matches a time that is prior to a specific time from a current time. The controller acquires a first extended pointer stored in a first entry among the plurality of entries that corresponds to the first time range. The controller identifies one or more commands stored in the first queue within the first time range by using the first extended pointer. The controller aborts the identified one or more commands.

Hereinafter, an embodiment is described below with reference to the drawings.

Figure 1:
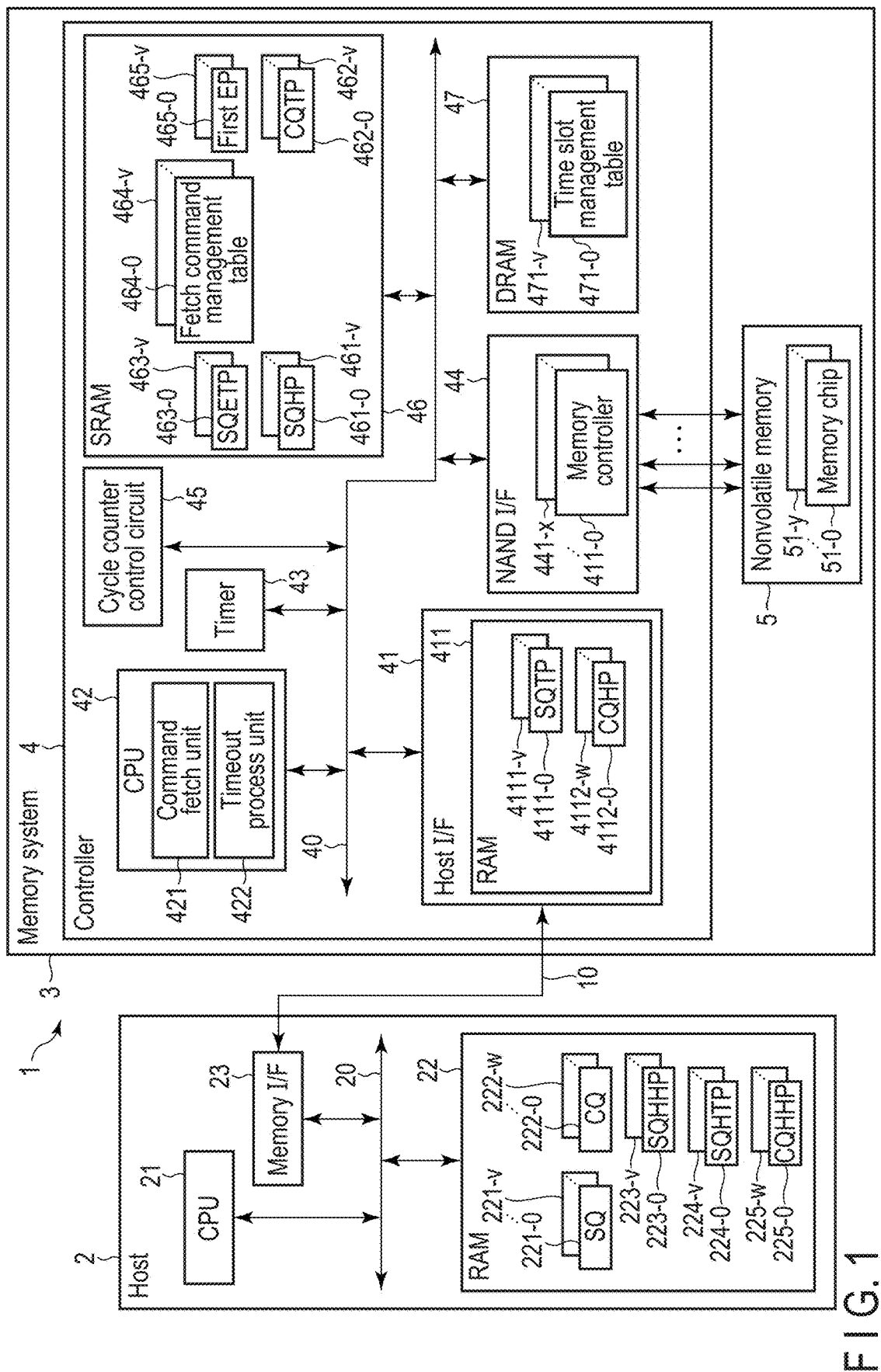
FIG. 1 is a block diagram illustrating an example of a configuration of an information processing system that includes a memory system according to an embodiment.

FIG. 1 is a block diagram illustrating an example of a configuration of an information processing system 1 that includes a memory system according to the embodiment. The information processing system 1 includes a host (host device) 2 and a memory system 3.

The host 2 is an information processing device. The host 2 is, for example, a personal computer, a server computer, or a mobile device. The host 2 accesses the memory system 3. Specifically, the host 2 issues a write command, which is a command to write data, to the memory system 3. The host 2 also issues a read command, which is a command to read data, to the memory system 3. Furthermore, the host 2 issues an admin command, which is a command to manage the memory system 3, to the memory system 3. The host 2 may also issue other types of commands to the memory system 3 when accessing the memory system 3.

The memory system 3 is a storage device that is connectable to the host 2. The memory system 3 is realized, for example, as a solid state drive (SSD). The memory system 3 includes a nonvolatile memory. The memory system 3 is capable of writing data into the internal nonvolatile memory. The memory system 3 is also capable of reading data from the internal nonvolatile memory.

Communication between the memory system 3 and the host 2 is executed through a bus 10. The bus 10 is a transmission path connecting the host 2 and the memory system 3. The bus 10 is, for example, a PCI Express™ (PCIe™) bus. Through this bus, the host 2 can read and write a RAM 411 of the memory system 3, and the memory system 3 can read and write a RAM 22 of the host 2.

As a logical interface standard for connecting the host 2 and the memory system 3, for example, the NVM Express™ (NVMe™) standard may be used. In the NVMe standard interface, a communication between the host 2 and the memory system 3 is performed using a pair of queues that includes at least one submission queue (SQ) and a completion queue (CQ) associated with the at least one submission queue (SQ). The pair of queues is referred to as a submission queue/completion queue pair (SQ/CQ pair). One completion queue may correspond to a plurality of submission queues.

Next, the configuration of the host 2 will be described.

The host includes a CPU 21, the RAM 22, and a memory interface (memory I/F) 23. The CPU 21, the RAM 22, and the memory I/F 23 are interconnected through an internal bus 20. Note that the memory interface (memory I/F) 23 may also be referred to as a root port.

The CPU 21 is, for example, a processor. The CPU 21 executes software (host software) loaded into the RAM 22 from the memory system 3 or another storage device connected to the host 2. The host software includes, for example, an operating system, a file system, and an application program.

The RAM 22 is, for example, a volatile memory. The RAM 22 is also referred to as a main memory, system memory, or host memory. The RAM 22 is, for example, a dynamic random access memory (DRAM). A part of a storage area of the RAM 22 is used to store submission queues (SQs) 221-0, . . . , 221-v, and completion queues (CQs) 222-0, . . . , 222-w. The other part of the storage area of the RAM 22 is used to store submission queue host head pointers (SQHHPs) 223-0, . . . , 223-v, submission queue host tail pointers (SQHTPs) 224-0, . . . , 224-v, and completion queue host head pointers (CQHHPs) 225-0, . . . , 225-w.

Each of the submission queues 221-0, . . . , 221-v is a queue for storing commands issued by the host 2 to the memory system 3. In other words, each of the submission queues 221-0, . . . , 221-v is a queue used by the host 2 to issue commands (input/output (I/O) commands, admin commands) to the memory system 3. The I/O commands are commands to write data to or read data from the nonvolatile memory of the memory system 3. Each of the submission queues 221-0, . . . , 221-v includes a plurality of slots. Each of the plurality of slots can store one command. In addition to the command, it is also possible to store a command identifier (CID) that enables the host 2 to identify the issued command by combining it with a submission queue ID that identifies a submission queue. The host 2 creates a submission queue in the RAM 22 of the host 2. The host 2 also issues a submission queue create command to the memory system 3. A submission queue (SQ) base address indicating a storage location in the RAM 22 where each of the submission queues has been created, the size of each of the created submission queues, a completion queue identifier (completion queue ID) associated with these submission queues, that is, to which a completion notification of a command issued using each of the submission queues is written, etc., are notified to the memory system 3 by the submission queue create command. The SQ base address is, for example, an address indicating a storage location in the RAM 22 that corresponds to a first slot of the plurality of slots in a corresponding submission queue. The size of the submission queue is, for example, the number of slots in the corresponding submission queue. The host 2 uses SQHHPs 223-0, . . . , 223-v and SQHTPs 224-0, . . . , 224-v, to manage submission queues 221-0, . . . , 221-v. For example, submission queue 221-n corresponds to SQHHP 223-n and SQHTP 224-n (where n is any integer from 0 to v.) SQHHP 223-n, as an initial value indicates the head of the queue; however, thereafter is the latest pointer pointing to a slot notified by the memory system 3 to the host 2, and that pointer indicates a next slot after a slot where the latest fetched command is stored. SQHTP 224-n indicates a free slot in which a new command will be stored next among the plurality of slots in submission queue 221-n. In the following, a case will be described in which the host 2 issues an I/O command to the memory system 3 by using a submission queue used to issue the I/O command. A "command" described hereafter is, for example, an I/O command. However, in the present embodiment, the same processing may be executed even in a case where an admin command or another type of command is issued from the host 2 to the memory system 3 instead of the I/O command.

Completion queues 222-0, . . . , 222-w are queues for storing completion responses indicating results of the command processing. In other words, completion queues 222-0, . . . , 222-w are used to receive completion responses from the memory system 3. The completion response includes an ID of a submission queue in which a corresponding command was issued, a CID of the command, and a status indicating that the command processing is successful or failed. The completion response is also referred to as command completion, or command completion notification. Each of the completion queues 222-0, . . . , 222-w includes a plurality of slots. Each of the plurality of slots is capable of storing a completion response. The host 2 creates a completion queue in the RAM 22 of the host 2. The host 2 also issues a completion queue create command to the memory system 3. A completion queue (CQ) base address indicating a storage location in the RAM 22 where the completion queue has been created, and the size of this completion queue, etc., are notified to the memory system 3 by the completion queue create command. The CQ base address is an address that indicates a storage location in the RAM 22 corresponding to a first slot of the plurality of slots in the corresponding completion queue. The size of the completion queue is the number of slots in the completion queue. The host 2 uses CQHHPs 225-0, . . . , 225-$w$ to manage completion queues 222-0, . . . , 222-$w$. For example, completion queue 222-$m$ corresponds to CQHHP 225-$m$ (where m is any integer from 0 to w.) CQHHP 225-$m$ is a pointer that indicates a slot in which the next completion response to be processed is stored among the plurality of slots in completion queue 222-$m$. The host 2 does not directly receive a completion queue tail pointer from the memory system 3. Instead, each slot in the completion queue has a field called a phase tag bit, and each time the memory system 3 overwrites a slot, it inverts the value of this bit from its value before the overwrite. For example, if it is set to zero in an initial state, this bit is set to one when completion information is written to the completion queue. The host 2 reads the value of this bit for each slot in turn and can determine that the slot in which this bit changes to zero is the slot indicated by the tail pointer of the completion queue. When the memory system 3 writes to the last slot of the completion queue, it next writes to the first slot of the completion queue; however, this time the phase tag bit is set to zero. After completing completion processing to the end of the completion queue, the host 2 also moves a read destination to the head of the queue; however, this time it determines that a slot where the value of this bit changes to one is the slot indicated by the tail pointer of the completion queue.

In other words, the memory system 3 inverts the value of the phase tag bit to be written each time a write destination moves to the head of the completion queue. The host 2 also inverts the value of the phase tag bit to be compared each time the read destination moves to the head of the completion queue.

The memory interface 23 is a communication interface circuit that executes communication with the memory system 3. The memory interface 23 is realized, for example, by a PCIe controller.

Next, an internal configuration of the memory system 3 will be described. The following assumes a case in which the nonvolatile memory included in the memory system 3 is realized by a NAND flash memory. Note that the NAND flash memory may be other flash memory or other nonvolatile memory such as MRAM, ReRAM, FeRAM, or phase-change memory.

The memory system 3 includes a controller 4 and a nonvolatile memory 5.

The controller 4 is a memory controller. The controller 4 is a control circuit, such as a system-on-a-chip (SoC). The controller 4 is electrically connected to the nonvolatile memory 5. The controller 4 executes read processing to read data from the nonvolatile memory 5 and write processing to write data into the nonvolatile memory 5 by processing each I/O command received from the host 2. For example, a toggle interface or an open NAND flash interface (ONFI) is used as a physical interface connecting the controller 4 and the nonvolatile memory 5. Functions of each part of the controller 4 may be realized by dedicated hardware, a processor executing a program, or a combination of the dedicated hardware and the processor.

The nonvolatile memory 5 may be a flash memory with a two-dimensional structure or a three-dimensional structure. The nonvolatile memory 5 includes a plurality of blocks. Each of the plurality of blocks is the smallest unit of a data erase operation. Each of the plurality of blocks is also referred to as a memory block or physical block. Each of the plurality of blocks includes a plurality of pages. Each of the plurality of pages is a unit for each of data write and data read operations. A page includes a set of memory cells connected to the same word line. A page is also referred to as a physical page.

The nonvolatile memory 5 includes a plurality of memory chips 51-0, . . . , 51-$y$. A memory chip is also referred to as a die, memory die, flash die, or flash chip. Each of these memory chips is realized as a NAND flash memory chip.

Next, an internal configuration of the controller 4 will be described. The controller 4 includes, for example, a host interface (host I/F) 41, a CPU 42, a timer 43, a NAND interface (NAND I/F) 44, a cycle counter control circuit 45, a static RAM (SRAM) 46, and a dynamic RAM (DRAM) 47. The host I/F 41, the CPU 42, the timer 43, the NAND I/F 44, the cycle counter control circuit 45, the SRAM 46, and the DRAM 47 are interconnected through an internal bus 40.

The host interface 41 is a communication interface circuit that executes communication with the host 2. The host interface 41 executes communication with the host 2 through, for example, the memory interface 23 of the host 2. The host interface 41 is realized by, for example, a PCIe controller. The host interface 41 includes the RAM 411. The host interface 41 may also be referred to as an end point.

The RAM 411 is a volatile memory. The RAM 411 includes a plurality of submission queue tail pointers (SQTPs) 4111-0, . . . , 4111-$v$ and a plurality of completion queue head pointers (CQHPs) 4112-0, . . . , 4112-$w$.

SQTPs 4111-0, . . . , 4111-$v$ are pointers corresponding to submission queues 221-0, . . . , 221-$v$, respectively. SQTPs 4111-0, . . . , 4111-$v$ are values stored in submission queue (SQ) tail doorbell registers in the storage area of the RAM 411. Each of the doorbell registers is a storage area in the RAM 411 that, has a function of when written to from the outside through an I/F, notifying the CPU 42 to generate an interrupt or activate hardware such as the cycle counter control circuit 45, and rapidly starting operation in response to the write.

For example, SQTP 4111-$n$ is a pointer indicating a first slot in which the next new command will be stored among the plurality of slots in submission queue 221-$n$. In other words, a slot indicated by an SQTP is a free slot in which no command is stored. The value of the SQTP is updated by the host 2 performing write access to the SQ tail doorbell register. This activates the cycle counter control circuit 45 to update an SQETP and also activates a command fetch unit 421 to fetch a new command if possible.

CQHPs 4112-0, . . . , 4112-$w$ are pointers corresponding to completion queues 222-0, . . . , 222-$w$, respectively. CQHPs 4112-0, . . . , 4112-$w$ are values stored in completion queue (CQ) head doorbell registers in the storage area of the RAM 411. For example, the CQHP 4112-$m$ indicates the next slot after a last slot processed by the host 2 among the plurality of slots in completion queue 222-$m$. The value of a CQHP is updated by the host 2 performing write access to a CQ head doorbell register. When the CQHP is updated, the memory system 3 can advance the CQTP to one-slot before the CQHP. In other words, even if the completion queue is full and therefore a new completion notification cannot be issued, an interrupt is generated in response to the CQHP updated by the host 2, and the memory system 3 can immediately start a completion notification operation.

The CPU 42 is a processor. The CPU 42 loads a control program (firmware) stored in the nonvolatile memory 5 or in a ROM (not shown) into the SRAM 46. The CPU 42 then performs various processing by executing this firmware. Note that the CPU 42 may load the firmware into the DRAM 47 instead of the SRAM 46.

The CPU 42, for example, performs management of data stored in the nonvolatile memory 5 and management of blocks included in the nonvolatile memory 5 as a flash translation layer (FTL). The management of data stored in the nonvolatile memory 5 includes, for example, management of mapping information. The CPU 42 manages the mapping between each logical address and each physical address in units for a management size by using mapping information in an L2P table (not shown). The management size is, for example, 4 KiB. The logical address is an address used by the host 2 to specify data stored in the nonvolatile memory 5. For example, a logical block address (LBA) is used as the logical address. The physical address is an address used by the controller 4 and the nonvolatile memory 5 to specify a storage location in the nonvolatile memory 5.

In the nonvolatile memory 5, data can only be written to a page in a block once per program/erase cycle of this block. In other words, new data cannot be directly overwritten to a storage location in the block (physical storage location) where data has already been written. Therefore, in a case of updating the data that has already been written to the physical storage location within the block, the controller 4 writes the new data to an unwritten page (free page) within that block (or another block) and handles the previous data as invalid data. In other words, the controller 4 writes the update data corresponding to a certain logical address to a different physical storage location rather than to the physical storage location where the previous data corresponding to this logical address is stored. The controller 4 then updates the L2P table to associate this logical address with a physical address that indicates this other physical storage location.

The management of blocks included in the nonvolatile memory 5 includes management of defective blocks (bad blocks) included in the nonvolatile memory 5, wear leveling, and garbage collection (GC).

The CPU 42 includes the command fetch unit 421 and a timeout process unit 422.

The command fetch unit 421 executes command fetch processing. The command fetch processing identifies a slot in which a command to be fetched is stored among the plurality of slots in the plurality of submission queues 221-0, . . . , 221-v, and fetches the command stored in the identified slot. For example, the command fetch unit 421 fetches the command from the slot indicated by SQHP 461-n among the plurality of slots in submission queue 221-n. The command fetching unit 421 stores information on the fetched command in fetch command management table 464-n. The information on the fetched command includes at least the contents and the CID of the fetched command. The contents of the command includes information indicating the type of the command and a logical address specified by the command, etc. When a command has been fetched, the command fetch unit 421 advances SQHP 461-n by one. This operation is repeated until an upper limit of commands that can be fetched is reached, or until SQHP 461-n reaches SQTP 4111-n, that is, until submission queue 221-n is free. In a case where the upper limit of commands that can be fetched is reached, a new command is fetched as soon as the fetched command is completed.

The command fetch unit 421 also includes an arbitration mechanism (not shown). This arbitration mechanism selects a submission queue from which a command is to be fetched from among the plurality of submission queues 221-0, . . . , 221-v of the host 2. The arbitration mechanism is, for example, a round-robin arbitration mechanism or a weighted round-robin arbitration mechanism.

The timeout process unit 422 executes a timeout process. The timeout process is processing that identifies at least one command issued by the host 2 whose elapsed times since issuance have reached a specific time (hereinafter referred to as timeout time), and aborts the identified commands. Here, each of the times elapsed since the command was issued is the time elapsed since the command was stored in the submission queue and a new SQTP was written to a corresponding submission queue tail doorbell register 4111. The timeout time is specified by the host 2 for each submission queue, for example. Hereinafter, the timeout time corresponding to submission queue 221-n is referred to as timeout time TOn. The timeout process unit 422 also periodically executes the timeout process for each of the submission queues 221-0, . . . , 221-v. For example, the timeout process unit 422 executes the timeout process for submission queue 221-n each time a time Tn elapses, where Tn is also referred to as a first time. The timeout process unit 422 may set the time interval at which the timeout process is executed to a different time interval for each submission queue. In other words, the timeout process unit 422 executes the timeout process for commands issued via submission queue 221-n each time the first time Tn elapses. Here, the timeout process unit 422 may set the first time Tn so that the timeout time TOn is an integer multiple of the first time Tn (i.e., TOn=Mn×Tn, where Mn is an integer of one or more). The timeout process unit 422 executes the timeout process for commands issued via the submission queue 221-m each time a second time Tm elapses.

The timer 43 is a hardware circuit that counts time. The timer 43 has, for example, a timer tick Tc. The timer 43 may issue a notification to other components of the controller 4 each time the timer tick Tc elapses. The timer tick Tc is also referred to as a third time. For example, each of the first time Tn corresponding to the submission queue 221-n and the second time Tm corresponding to the submission queue 221-m may be set to an integer multiple of the third time Tc.

The NAND interface 44 is a circuit that controls the nonvolatile memory 5. The NAND interface 44 includes a plurality of memory controllers 441-0, . . . , 441-x. Each of the plurality of memory controllers 441-0, . . . , 441-x is electrically connected to one or more of the plurality of memory chips 51-0, . . . , 51-y included in the nonvolatile memory 5.

The cycle counter control circuit 45 is a hardware circuit that controls a cycle counter for each submission queue. The cycle counter indicates one cycle among a plurality of cycles in which commands are respectively stored in the plurality of slots of the submission queue in each cycle. In one cycle, issuing and fetching a command is repeated, so that commands are stored once in respective slots from the first slot to the last slot in the submission queue. Then, when the slot in which the next issued command is to be stored becomes the first slot, the cycle shifts from the current cycle to the next cycle. In other words, the cycle counter corresponds to the number of times SQTP has cycled through the slots of the submission queue. When the SQTP 4111-n is updated to a value smaller than the value of the SQTP 4111-n before the update, the cycle counter control circuit 45 starts to operate by the function of the doorbell register and updates the cycle counter corresponding to the submission queue 221-$n$. In a case where the cycle counter corresponding to the submission queue 221-$n$ is a value other than an upper limit value, the cycle counter control circuit 45 increments the cycle counter by one. In a case where the cycle counter corresponding to the submission queue 221-$n$ is the upper limit value, the cycle counter control circuit 45 updates (sets) the cycle counter to its initial value. The upper limit value of the cycle counter is determined by at least one of the following: the number of slots in the corresponding submission queue, the timeout time, and the number of commands issued through the corresponding submission queue and being possible to be processed by the controller 4 while the timeout time elapses.

The SRAM 46 is a volatile memory. The storage area of the SRAM 46 is used, for example, as a work area of the CPU 42. The SRAM 46 also includes storage areas for storing a plurality of submission queue head pointers (SQHPs) 461-$0$, . . . , 461-$v$, a plurality of completion queue tail pointers (CQTPs) 462-$0$, . . . , 462-$w$, submission queue extended tail pointers (SQETPs) 463-$0$, . . . , 463-$v$, fetch command management tables 464-$0$, . . . , 464-$v$, and first EPs 465-$0$, . . . , 465-$v$.

SQHPs 461-$0$, . . . , 461-$v$ are pointers correspond to submission queues 221-$0$, . . . , 221-$v$, respectively. For example, SQHP 461-$n$ indicates a slot in which a command to be fetched next is stored among the plurality of slots in submission queue 221-$n$. When the controller 4 has fetched one command from the slot in the submission queue 221-$n$ indicated by the SQHP 461-$n$, it updates the value of the SQHP 461-$n$. In a case where the SQHP 461-$n$ before the update indicates a slot other than the last slot in the submission queue 221-$n$, the controller 4 increments the SQHP 461-$n$ by one. On the other hand, in a case where the SQHP 461-$n$ before the update indicates the last slot in the submission queue 221-$n$, the controller 4 updates (sets) the SQHP 461-$n$ to a value indicating the first slot in the submission queue 221-$n$. When transmitting a completion response after updating the SQHP 461-$n$, the controller 4 stores, in the completion response, an identifier of the submission queue (submission queue ID) corresponding to the submission queue 221-$n$ and the value of the updated SQHP 461-$n$. In this manner the controller 4 notifies the host 2 of the updated SQHP 461-$n$ value. Here, the command corresponding to the completion response may be a command fetched from a slot in the submission queue 221-$n$ or from a slot in another submission queue.

CQTPs 462-$0$, . . . , 462-$w$ are pointers corresponding to completion queues 222-$0$, . . . , 222-$w$, respectively. For example, CQTP 462-$m$ indicates a slot in which a new completion response is to be stored next among the plurality of slots in completion queue 222-$m$. In other words, a slot indicated by a CQTP is a free slot where no command is stored. The controller 4 updates CQTP 462-$m$ in response to completion of preparation for issuing one completion response to the completion queue 222-$m$. Here, in a case where the CQTP 462-$m$ before the update indicates a slot other than the last slot in the completion queue 222-$m$, the controller 4 increments the CQTP 462-$m$ by one. On the other hand, in a case where the CQTP 462-$m$ before the update indicates the last slot in the completion queue 222-$m$, the controller 4 updates (sets) the CQTP 462-$m$ to a value indicating the first slot in the completion queue 222-$m$. Then, the controller 4 stores the prepared completion response in the completion queue 222-$m$. Furthermore, when preparation for issuing two or more completion responses is completed, the host 2 may collectively update the value of the CQTP 462-$m$ by the number of the prepared command completions. After updating CQTP 462-$m$, the memory system 3 generates an interrupt to the host 2 through the memory I/F 23, so that the host 2 can know that at least one CQTP 462 has been updated. Depending on the type of interrupt, the ID of the completion queue can be notified along with the interrupt, in which case the host can identify the completion queue in which the CQTP 4114 has been updated.

SQETPs 463-$0$, . . . , 463-$v$ are extended pointers corresponding to submission queues 221-$0$, . . . , 221-$v$, respectively. The extended pointer includes a pointer field and a cycle counter field. For example, the pointer field of SQETP 463-$n$ indicates SQTP 4111-$n$, which corresponds to submission queue 221-$n$. The cycle counter field of SQETP 463-$n$ indicates the cycle counter corresponding to submission queue 221-$n$. SQETP 463-$n$ is updated in response to SQTP 4111-$n$ being updated. A current SQETP 463-$n$ is corresponding to a current SQTP 4111-$n$.

Fetch command management tables 464-$0$, . . . , 464-$v$ correspond to submission queues 221-$0$, . . . , 221-$v$, respectively. Fetch command management tables 464-$0$, . . . , 464-$v$ are tables used to manage commands received (fetched) from the host 2 and information related to a time range in which each of the commands was issued. Fetch command management tables 464-$0$, . . . , 464-$v$ each include a plurality of entries. Each of the plurality of entries in fetch command management table 464-$n$ stores at least contents of a command fetched from submission queue 221-$n$. For example, each of the plurality of entries in fetch command management table 464-$n$ stores the contents of the command fetched from submission queue 221-$n$ and an EP indicating a slot in which the command is stored. Alternatively, each of the plurality of entries in fetch command management table 464-$n$ stores the contents of the command fetched from submission queue 221-$n$ and information indicating a time slot corresponding to the command. A plurality of time slots are a plurality of contiguous time ranges in first time units. A command issued during a certain time slot corresponds to that time slot. Details of the time slots are described later.

The first EPs 465-$0$, . . . , 465-$v$ are extended pointers temporarily saved from time slot management tables 471-$0$, . . . , 471-$v$ described later. The first EP 465-$n$ corresponds to submission queue 221-$n$ and is an extended pointer saved from time slot management table 471-$n$. The first EP 465-$n$ is SQETP 463-$n$ at an end time of a time slot that is one time slot prior to a time slot that is a timeout target. Details of the first EPs 465-$0$, . . . , 465-$v$ are described later. Note that since the first EP is used immediately for calculations and is no longer needed afterwards, if possible, it may be loaded into a register of the CPU 42, etc., which is an arithmetic unit.

The DRAM 47 is a volatile memory. A part of the storage area of the DRAM 47 is used to store time slot management tables 471-$0$, . . . , 471-$v$. The DRAM 47 may be located outside of the controller 4 instead of inside of the controller 4.

Time slot management tables 471-$0$, . . . , 471-$v$ correspond to submission queues 221-$0$, . . . , 221-$v$, respectively. Time slot management tables 471-$0$, . . . , 471-$v$ are tables used to manage correspondence between each time slot and each extended pointer. Each of time slot management tables 471-$0$, . . . , 471-$v$ includes a plurality of entries. Each of the plurality of entries corresponds to one time slot. Each entry stores an SQETP at the end time of the corresponding time slot. In other words, each time Tn elapses, SQETP 463-*n* is stored in any one of the entries in time slot management table 471-*n* in turn. A command corresponding to a slot that is one slot before a slot indicated by an SQETP stored in an entry corresponding to a certain time slot is the latest command among commands issued by the end time of that time slot. Here, a case in which time slot management tables 471-0, . . . , 471-*v* are stored in the DRAM 47 is described; however, time slot management tables 471-0, . . . , 471-*v* may also be stored in the SRAM 46.

Figure 2:
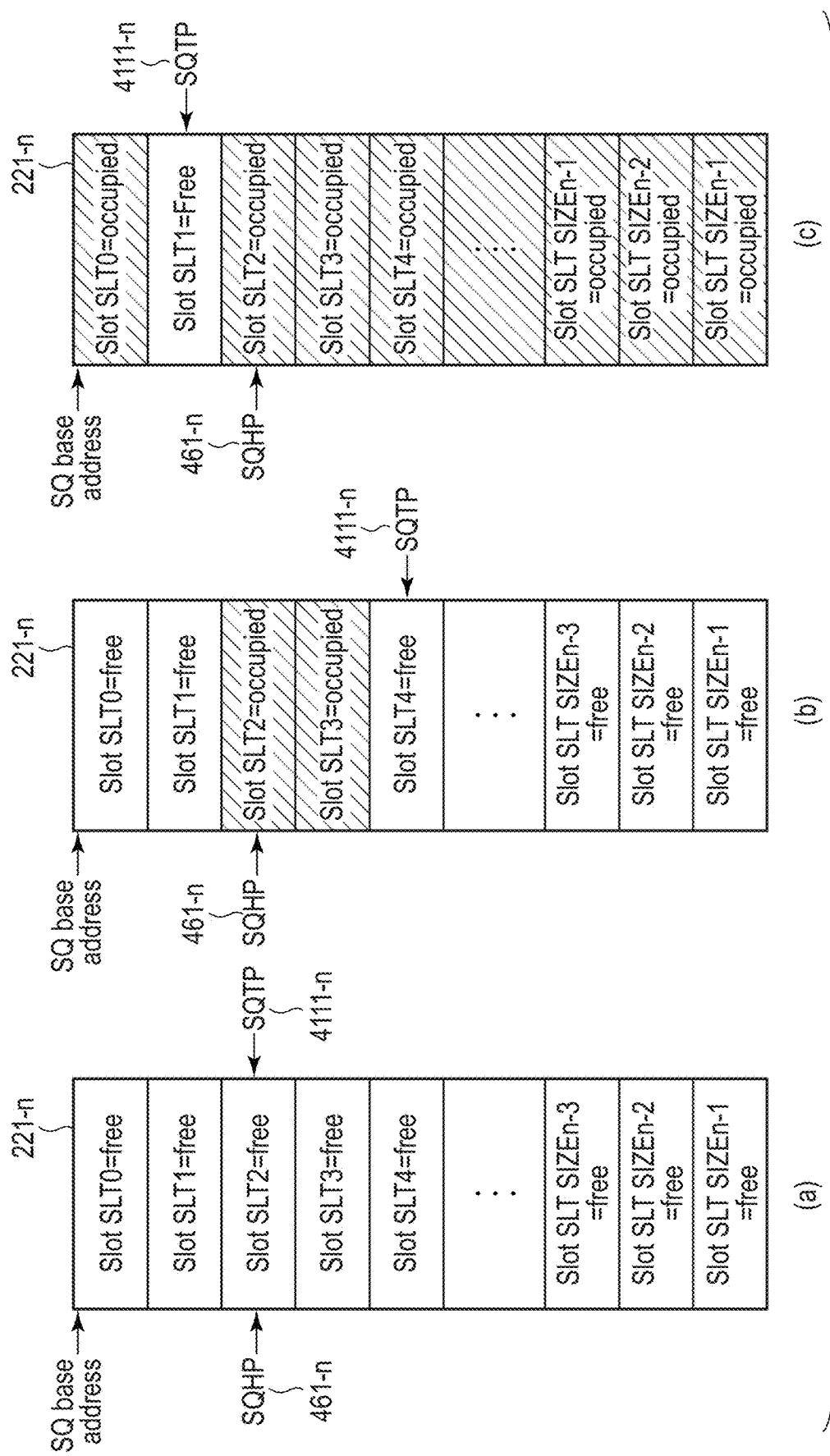
FIG. 2 illustrates an example of multiple states of a submission queue that is used in the information processing system including the memory system according to the embodiment.

Next, an example of a configuration of the submission queue is described. FIG. 2 illustrates a plurality of states of submission queue 221-*n* used in the information processing system 1 that includes the memory system 3 according to the embodiment. Here, the number of slots in submission queue 221-*n* is SIZEn, and the submission queue 221-*n* includes slots SLT0 to SLT SIZEn−1. This drawing shows the state recognized by the memory system 3; therefore, the state recognized by the host 2 is that in which SQHP 461-*n* is replaced by SQHHP 223-*n*, which is not shown, and SQTP 4111-*n* is replaced by SQHTP 224-*n*.

FIG. 2 (*a*) shows the submission queue 221-*n* in a free state. In other words, the plurality of slots of the submission queue 221-*n* are all free slots, with no commands stored in them.

In this case, the SQHP 461-*n* and the SQTP 4111-*n* both indicate the same slot (here, slot SLT2). For example, since the SQHP 461-*n* and the SQTP 4111-*n* indicate the same slot, the controller 4 determines that the submission queue 221-*n* is free and does not store any commands. In other words, the controller 4 determines that submission queue 221-*n* is a submission queue that does not store fetchable commands. Similarly, since SQHHP 223-*n* and SQHTP 224-*n* indicate the same slot, the host 2 determines that the submission queue 221-*n* is free and does not store any commands. The host 2 then identifies slot SLT2, indicated by the SQHTP 224-*n*, as the next slot in which a new command can be stored.

FIG. 2 (*b*) shows the submission queue 221-*n* in which two commands are stored. The submission queue 221-*n* in FIG. 2(*b*) is the submission queue 221-*n* in FIG. 2(*a*) in which two commands are stored.

When the command is stored in each of slots SLT2 and SLT3 of the submission queue 221-*n* in the state shown in FIG. 2(*a*), by performing write access to the SQTP 4111-*n* which is in state (b) and is the submission queue tail doorbell register, the host 2 updates the SQTP 4111-*n* in a manner incremented by two. As a result, the SQTP 4111-*n* becomes a value indicating slot SLT4, which is state (b), even from the perspective of the memory system 3. The host 2 may perform write access to the submission queue tail doorbell register SQTP 4111-*n* in the RAM 411 each time one command is stored in the submission queue 221-*n*, or may perform write access to the submission queue tail doorbell register SQTP 4111-*n* in the RAM 411 and update the SQTP 4111-*n* at once after storing a plurality of commands in the submission queue 221-*n*.

The slots SLT2 and SLT3 of the submission queue 221-*n* become "occupied", respectively since the commands are stored. The controller 4 determines that a fetchable command is stored in the submission queue 221-*n* when SQHP 461-*n* and SQTP 4111-*n* are different values. The controller 4 identifies the number of commands stored in the submission queue 221-*n* from a difference between the SQHP 461-*n* and the SQTP 4111-*n*. Here, since the difference between the SQHP 461-*n* and the SQTP 4111-*n* is two, and the SQHP 461-*n* indicates the slot SLT2, the controller 4 determines that fetchable commands are stored in the slots SLT2 and SLT3.

FIG. 2(*c*) shows the submission queue 221-*n* in a full state. When SIZEn−3 commands are additionally stored in the submission queue 221-*n* in FIG. 2(*b*), the submission queue 221-*n* becomes a full state.

When a command is stored in slot SLT SIZEn−1 of the submission queue 221-*n*, the next slot in which a new command is to be stored is slot SLT0. Therefore, the SQTP 4111-*n* is updated to a value indicating the slot SLT SIZEn−1 after the value indicating the slot SLT0. Because of this configuration, the submission queue 221-*n* is also referred to as a cyclic queue. When a command is stored in the slot SLT0, the host 2 updates the SQTP 461-*n* to a value indicating the slot SLT1. The host 2 (and the controller 4) determines that the submission queue 221-*n* is full when the value of the SQHTP 224-*n* (SQTP 4111-*n*) is a value that indicates a slot that is one slot prior to the slot indicated by the SQHHP 223-*n* (SQHP 461-*n*). The host 2 does not store a command in the slot SLT1 of the submission queue 221-*n* until the SQHHP 223-*n* is updated by notification from the memory system 3, and the submission queue 221-*n* is no longer in full state.

Here, the configuration of the submission queue 221-*n*, which is one of submission queues 221-0, . . . , 221-*v*, is described through exemplification. However, the configuration of completion queues 222-0, . . . , 222-*w* may also be realized with a similar cyclic queue.

However, since the host 2 does not directly manage the tail pointer of the completion queue, a pointer indicating a slot whose phase tag bit value has changed becomes the tail pointer that can be recognized by the host 2.

Figure 3:
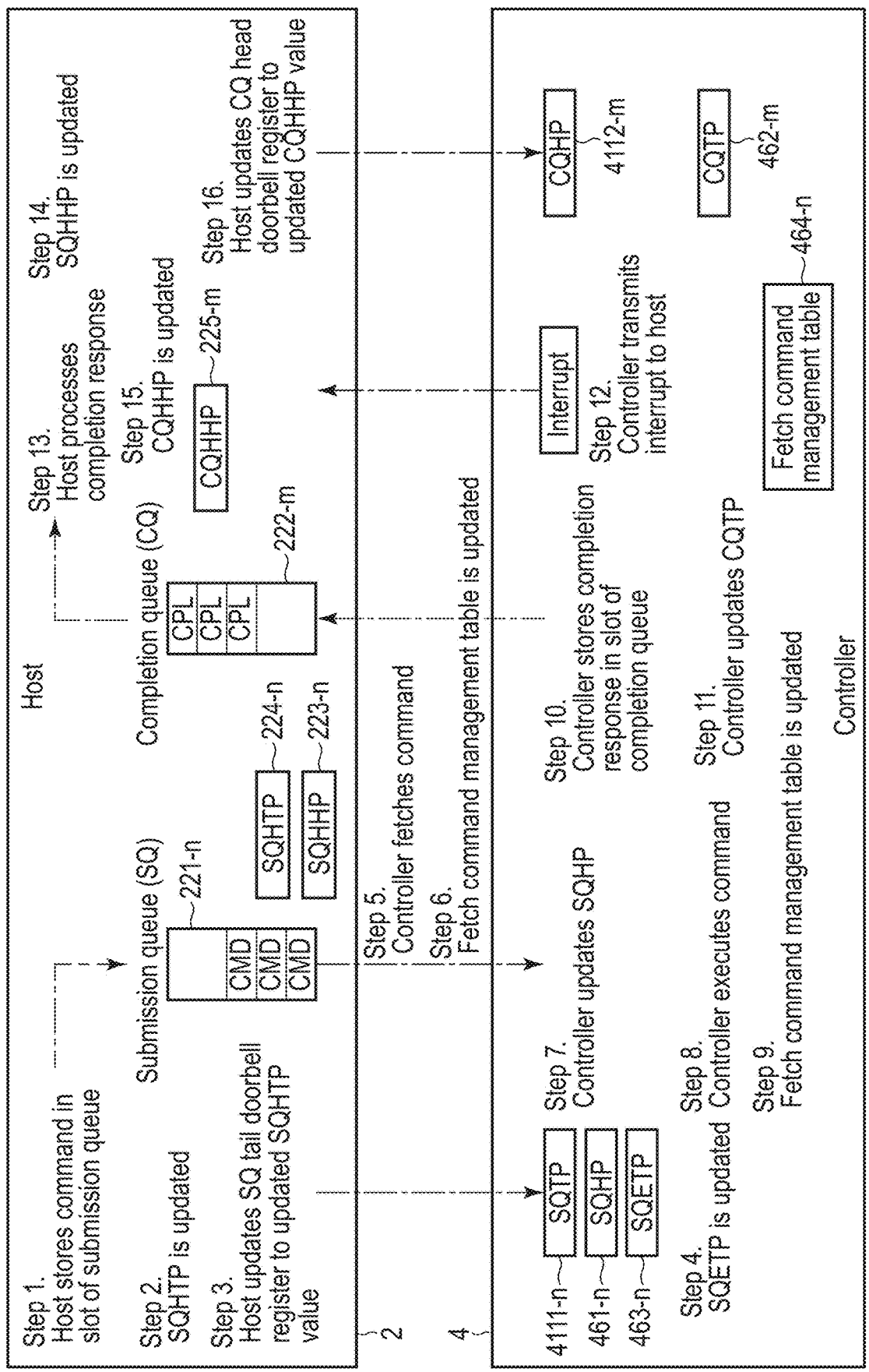
FIG. 3 illustrates a flow of a command process executed in the information processing system including the memory system according to the embodiment.

Next, command process will be described. FIG. 3 illustrates a flow of the command process executed in the information processing system 1 including the memory system 3 according to the embodiment. Here, a case is described in which the host 2 issues a command via the submission queue 221-*n*, the controller 4 of the memory system 3 processes the issued command, and a completion response corresponding to the processed command is transmitted via the completion queue 222-*m*.

Step 1: The host 2 stores one or more new commands to be transmitted to the memory system 3 in one or more free slots in the submission queue 221-*n*. These one or more new commands are stored in one or more free slots starting with a slot indicated by a current value of the SQHTP 224-*n*. The new commands to be stored in the submission queue 221-*n* may be write commands, read commands, or other commands. In FIG. 2, each command stored in the submission queue 221-*n* is denoted as "CMD".

Step 2: The host 2 updates the value of the SQHTP 224-*n*. The host 2 increments the value of the SQHTP 224-*n* by the number of commands stored in step 1.

Step 3: To notify the controller 4 of the memory system 3 that one or more new commands have been stored in the submission queue 221-*n*, the host 2 performs write access to the submission queue tail doorbell register in the memory system 3 corresponding to this submission queue 221-*n*, and updates the value of the SQTP 4111-*n* corresponding to this submission queue 221-*n*. The value of the SQTP 4111-*n* is updated to the value of the updated SQHTP 224-*n*. Such an update of the SQTP 4111-*n* via the doorbell register triggers the controller 4 to start processing each of the commands stored in the submission queue 221-*n*.

Step 4: The controller 4 updates the SQETP 463-*n* in response to the update of SQTP 4111-*n*. The controller 4 compares the updated SQTP 4111-$n$ stored in the SQ tail doorbell register with a pre-updated SQTP 4111-$n$ stored in the pointer field of the SQETP. In a case where the updated SQTP 4111-$n$ is smaller than the pre-updated SQTP 4111-$n$, the controller 4 determines that SQTP 4111-$n$ has cycled from the last slot (e.g., slot SLT SIZEn−1) to the first slot (e.g., slot SLT0) and updates the cycle counter. Here, in a case where the cycle counter is at its upper limit value, the controller 4 sets the cycle counter to its initial value (usually zero, which is the minimum value). In a case where the cycle counter is other than the upper limit value, the controller 4 increments the cycle counter by one. Then, the controller 4 stores the updated cycle counter and the updated SQTP as the updated SQETP 463-$n$. On the other hand, in a case where the updated SQTP 4111-$n$ is greater than or equal to the pre-updated SQTP 4111-$n$, the controller 4 simply stores the updated SQTP 4111-$n$ in the SQETP 463-$n$ pointer field.

Step 5: The controller 4 can recognize the number of new commands stored in the submission queue 221-$n$ from the difference between the new value of the SQTP 4111-$n$ and the value of the SQHP 461-$n$. The controller 4 fetches one or more any number of commands from the submission queue 221-$n$.

Step 6: The controller 4 updates fetch command management table 464-$n$ to store information related to the fetched commands in the fetch command management table 464-$n$. The controller 4 selects one invalidated entry in the fetch command management table 464-$n$ as an entry where information related to one fetched command is to be stored. The controller 4 then stores in that one entry the contents of that one command, the CID, and an extended pointer indicating the slot in the submission queue 221-$n$ where that one command is stored. The contents of each command fetched in step 5 may be managed using the fetch command management table 464-$n$. Each command fetched in step 5 may be temporarily stored in a storage area of the SRAM 46, which is different from a storage area storing the fetch command management table 464-$n$. In a case where the commands are fetched one at a time, that is, in a case where the command of a slot indicated by the SQEHP is fetched and the SQEHP is advanced by one each time, the extended pointer is the SQEHP at the time of fetching. Alternatively, the controller 4 stores the contents of the command and information indicating the time slot including the command in one entry in the fetch command management table 464-$n$. The information indicating the time slot is, for example, a value indicating one entry included in the time slot management table 471-$n$ to which that time slot is associated.

Step 7: The controller 4 updates the value of the SQHP 461-$n$ so that the value of the SQHP 461-$n$ corresponding to the submission queue 221-$n$ increases by the number of commands fetched in step 5.

Step 8: The controller 4 executes each of the fetched commands. With some exceptions, the order in which these commands are executed is not restricted, and these commands may be executed in a different order than the order in which these commands were fetched. In the processing of executing each commands, the controller 4 writes data in the RAM 22 of the host 2 to the nonvolatile memory 5 or data in the nonvolatile memory 5 to the RAM 22 of the host 2, as necessary.

Step 9: When processing of one certain command is completed, the controller 4 updates the fetch command management table 464-$n$ to invalidate one entry in the fetch command management table 464-$n$ corresponding to the command for which processing has been completed. The invalidated entry becomes an entry that can store new information.

Step 10: The controller 4 stores, in the next free slot in completion queue 222-$m$, a new response indicating the CID corresponding to the ID of the submission queue in which this command was stored, the status of the completion of the command, the updated SQHP of a certain submission queue, and the ID of that queue. The new response indicates the completion of the command. This free slot is a slot indicated by CQTP 462-$m$ before it was updated in step 10. In FIG. 2, each completion response stored in the completion queue 222-$m$ is denoted as "CPL". The completion queue 222-$m$ is associated with the submission queue 221-$n$ from which the completed command was fetched, and the completion response for the command issued in the submission queue 221-$n$ is always made in the completion queue 222-$m$.

Step 11: The controller 4 then updates the CQTP 462-$m$ corresponding to the completion queue 222-$m$ and increments the value of this CQTP 462-$m$ by one. In steps 10 and 11, the case where the CQTP 462-$m$ is updated after the completion response is stored in the completion queue 222-$m$ is described; however, the controller 4 may also store the completion response in the completion queue 222-$m$ after the CQTP 462-$m$ is updated.

Step 12: The controller 4 transmits an interrupt to the host 2. The controller 4 may transmit an interrupt to the host 2 including an interrupt vector corresponding to the completion queue 222-$m$ in which the completion response was stored in step 11 to notify the host 2 that a new completion response has been stored in the completion queue 222-$m$.

Step 13: The host 2 acquires the completion response from the slot indicated by the current value of CQHHP 225-$m$ and processes the acquired completion response. A request source that issued this command is identified from the submission queue ID and CID included in the completion response, and a completion response is returned in response to the request.

Step 14: The host 2 updates the SQHHP based on the submission queue ID and the SQHP value included in the completion response processed in step 13. The submission queue ID is, for example, an identifier corresponding to the submission queue 221-$n$. The submission queue ID and the SQHP value included in the completion response may be information related to the SQHP value updated in response to fetching of a command other than the command corresponding to this completion response. The submission queue ID may be an identifier indicating a submission queue other than the submission queue 221-$n$. However, the submission queue ID and the SQHHP included in one completion response correspond to one submission queue.

Step 15: In response to processing one completion response in step 13, the host 2 updates the CQHHP 225-$m$ and increments the CQHHP 225-$m$ by one. At this time, in a case where the CQHHP 225-$m$ before update indicates a slot other than the last slot of the completion queue 222-$m$, the controller 4 increments the CQHHP 225-$m$ by one. On the other hand, in a case where the CQHHP 225-$m$ before the update indicates the last slot of the completion queue 222-$m$, the controller 4 updates the CQHHP 225-$m$ to a value indicating a first slot of the completion queue 222-$m$. This is repeated, and the completion response in step 13 is performed until the slot immediately before the phase tag bit value is inverted. After processing two or more completion responses, the host 2 may also update the CQHHP 225-$m$ to increment the value of the CQHHP 225-$m$ by the number of command completions processed.

Step 16: The host 2 updates the value of the CQHP 4112-$m$ by performing write access to the completion queue head doorbell register in the memory system 3 corresponding to the completion queue 222-$m$. The value of the CQHP 4112-$m$ is updated to the value of the CQHHP 225-$m$ updated in step 15.

Figure 4:
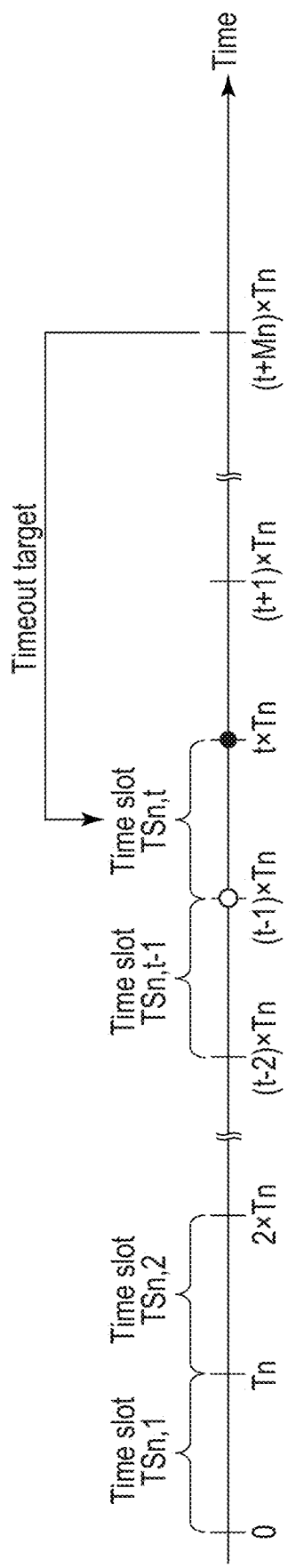
FIG. 4 illustrates an example of time slots used in the memory system according to the embodiment.

Next, time slots will be described. FIG. 4 illustrates an example of the time slot used in the memory system 3 according to the embodiment.

The controller 4 manages a plurality of time slots for each submission queue. For example, the controller 4 manages a plurality of time slots corresponding to the submission queue 221-$n$. The plurality of time slots corresponding to the submission queue 221-$n$ are a plurality of contiguous time ranges in units of the first time Tn. One time slot is a time range of the first time Tn.

In FIG. 4, a time starting from 0 and a plurality of time slots corresponding to the submission queue 221-$n$ are shown. In the following, the time slots corresponding to the submission queue 221-$n$ and corresponding to a range from time $(t-1) \times Tn$ to time $t \times Tn$ are denoted TSn,t. Here, t is an integer.

The controller 4 manages the commands issued to the submission queue 221-$n$ during a certain time slot by corresponding them to that time slot. Specifically, the controller 4 corresponds the commands issued to the submission queue 221-$n$ between a period after time $t \times Tn$ has elapsed until time $(t-1) \times Tn$ is reached to time slot TSn,t. In other words, the commands issued to the submission queue 221-$n$ at time $(t-1) \times Tn$ are not corresponding to time slot TSn,t, but to time slot TSn,t-1. The commands issued to the submission queue 221-$n$ at time $t \times Tn$ are corresponding to time slot TSn,t.

The controller 4 executes timeout processes in units for time slots. In a case where the timeout time TOn is $Mn \times Tn$, the controller 4 executes timeout processes for the commands corresponding to time slot TSn,t that have not yet been processed at time $(t+Mn) \times Tn$. Here, Mn is an integer greater than or equal to one. At this time, the time that has elapsed since the commands corresponding to time slot TSn,t were issued to the submission queue 221-$n$ is greater than or equal to $Mn \times Tn$ and less than $(Mn+1) \times Tn$. In other words, at time $(t+Mn) \times Tn$, the time that has elapsed since the commands corresponding to time slot TSn,t were issued to the submission queue 221-$n$ is greater than or equal to $Mn \times Tn$.

By using such time slots, the controller 4 does not need to keep track of the time that has elapsed since the commands were issued to the submission queue for each of the plurality of commands received (fetched). In particular, in a memory system 3 where a large number of commands are processed in parallel at one time, the need to measure the time elapsed since issuance for each command that is not yet processed can be avoided.

Thus, the controller 4 times out a plurality of commands in a single time slot at one time. Therefore, the time from which a command is issued to submission queue 221-$n$ until it is timed out may take a value from $Mn \times Tn$ or more to less than $(Mn+1) \times Tn$. Therefore, the accuracy of the time until the command is actually timed out relative to the timeout time TOn ($=Mn \times Tn$) is denoted as $((Mn+1) \times Tn - Mn \times Tn)/(Mn \times Tn) = 1/Mn$. Thus, even in a case where the timeout time is changed, the accuracy of the timeout can be kept constant by fixing Mn and changing Tn.

The time slot TSn,t described here treats commands issued in the time range after the elapse of time $(t-1) \times Tn$ until $t \times Tn$ is reached as a group of commands issued at time $t \times Tn$. On the other hand, in a case where the time slot TSn,t treats commands issued in the time range from time $t \times Tn$ to before $(t+1) \times Tn$ is reached as a group of commands issued at time $t \times Tn$, Mn is an integer greater than or equal to 2. The commands that are timed out at time $(t+Mn) \times Tn$ are the commands issued in the time range from time $t \times Tn$ to before $(t+1) \times Tn$ is reached. The time that has elapsed since these commands were issued to the submission queue 221-$n$ is greater than $(Mn-1) \times Tn$ and less than or equal to $Mn \times Tn$.

Figure 5:
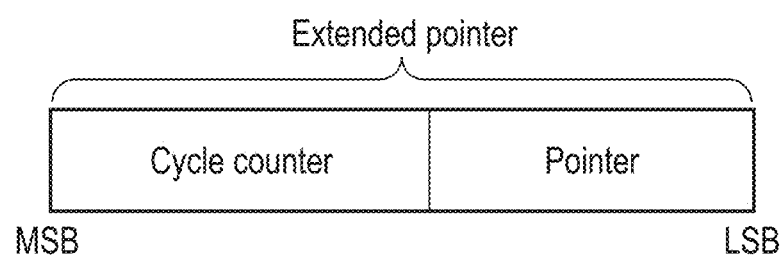
FIG. 5 illustrates an example of an extended pointer used in the memory system according to the embodiment.

Next, the extended pointer (EP) is described. FIG. 5 illustrates an example of an extended pointer used in the memory system 3 according to the embodiment.

The extended pointer includes a cycle counter and a pointer. The extended pointer corresponds to a slot in one virtual submission queue. One virtual submission queue slot may correspond to one command. The extended pointer is a pointer that extends the submission queue tail (or head) pointer. The extended pointer is a pointer to identify commands that may be target of the timeout process. In particular, the extended pointer is a pointer extended to identify commands that cannot be identified by a pointer indicating a slot in the submission queue because they have already been fetched from the submission queue. For example, the extended pointer includes a cycle counter field in which information indicating the cycle counter is stored and a pointer field in which information indicating the pointer is stored. Alternatively, the extended pointer may be realized by a bit sequence consisting of an upper bit that is the cycle counter field and a lower bit that is the pointer field.

The cycle counter indicates the number of times the pointer has cycled the cyclic queue. For example, the cycle counter corresponding to the SQTP 4111-$n$ of the submission queue 221-$n$ is incremented by one by the cycle counter control circuit 45 in a case where the updated SQTP 4111-$n$ value stored in the submission queue tail doorbell register is smaller than the SQTP before the update. At this time, in a case where the value of the cycle counter before the update is the upper limit value, the cycle counter control circuit 45 sets the cycle counter to its initial value instead of incrementing it by one.

An upper limit value MAXCC of the cycle counter corresponding to submission queue 221-$n$ is determined based on at least one of the size of the submission queue 221-$n$, the timeout time TOn, and the command processing speed of the memory system 3. For example, the upper limit value MAXCC of the cycle counter needs to be a value that allows the extended pointer to cover MAXCYCLE, which is a number obtained by adding one to an integer that is obtained by dividing the maximum value of the number of commands that can be issued by the host 2 during the timeout time TOn by the size of the submission queue 221-$n$ and rounding it up to the nearest whole number. Here, the maximum value of the number of commands that can be issued by the host 2 during the timeout time TOn is a number obtained by adding the size of the submission queue 221-$n$ to the maximum number of commands that the controller 4 can fetch from the submission queue 221-$n$ during the timeout time TOn.

Specifically, the size of submission queue 221-$n$ is SIZEn, the timeout time of submission queue 221-$n$ is TOn [s], and the command processing speed of the memory system 3 is MaxCom [1/s]. In this case, a maximum value MAXFN of the number of commands that can be fetched by the controller 4 from submission queue 221-$n$ before the timeout time TOn elapses is equal to the maximum value of the number of commands that can be processed by the controller 4 of the memory system 3 during the timeout time TOn. In other words, MAXFN becomes TOn×MaxCom. The maximum value of the number of commands that can be issued by the host 2 during the timeout time TOn is MAXFN+SIZEn. Therefore, MAXCYCLE is (TOn×MaxCom+SIZEn)/SIZEn+1. The upper limit value MAXCC of the cycle counter is then set to a value that defines the width of the field such that the extended pointer becomes large enough to store the calculated MAXCYCLE (for example, MAXCC=2 (width of field)−1).

Here, by setting MaxCom based on a command that can be processed rapidly among practical commands, the upper limit value of the cycle counter can be suppressed compared to a case in which impractical commands are processed. This allows the width of the cycle counter field to be reduced. Among the practical commands, commands that can be processed rapidly are, for example, a plurality of read commands that specify data of a minimum unit size and also specify contiguous logical addresses. Among the impractical commands, a command that can be processed rapidly is, for example, a command that is specified by an undefined code indicating a command type and causes an error indicating that the command is undefined.

The pointer is a pointer indicating one slot among a plurality of slots in the submission queue.

Next, an example of a virtual submission queue will be described. The submission queue extended head pointer (SQEHP) shown below has the same value as the submission queue extended tail pointer (SQETP) at the end time of the time slot that is one time slot earlier than the time slot of timeout target. The extended pointer with a cycle counter value of j and a pointer value of k is denoted as EP (j, k) (here, 0≤j≤MAXCC−1 and 0≤k≤SIZEn−1).

Figure 6:
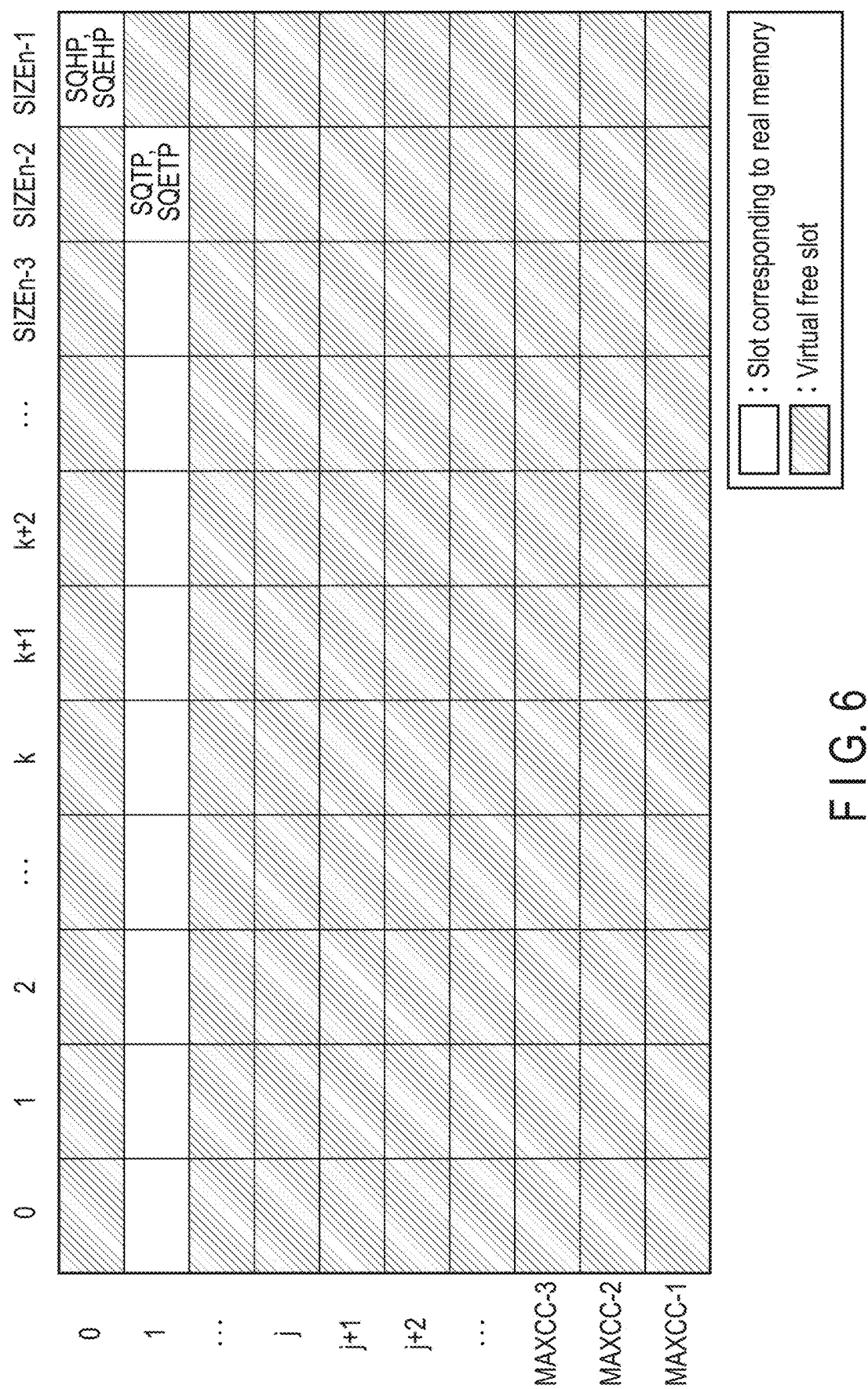
FIG. 6 illustrates a first state example of a virtual submission queue managed in the memory system according to the embodiment.

FIG. 6 illustrates an example of a first state of a virtual submission queue managed in the memory system 3 according to the embodiment. Each of the plurality of slots included in the virtual submission queue corresponds to one value that the extended pointer may take. Therefore, the number of slots included in the virtual submission queue corresponding to submission queue 221-*n* is determined by the upper limit value MAXCC−1 (vertical axis, the number of 0 to MAXCC−1) and the size of the submission queue 221-*n* (horizontal axis, the number of 0 to SIZEn−1). The submission queue 221-*n* in FIG. 6 is in a full state. All commands issued via the submission queue 221-*n* and in the virtual submission queue have not yet been fetched and are uncompleted.

The SQHP 461-*n* indicates slot SLT SIZEn−1, and the SQTP 4111-*n* indicates slot SLT SIZEn−2. Since the SQTP 4111-*n* indicates a slot that is one slot prior to the slot indicated by the SQHP 461-*n*, the submission queue 221-*n* is in a full state. At this time, the slot SLT SIZEn−2 indicated by the SQTP 4111-*n* is a free slot.

The extended pointer corresponding to the SQHP 461-*n* and the SQEHP 463-*n* is EP (0, SIZEn−1). The slot corresponding to the EP (0, SIZEn−1) is, the last slot in the submission queue 221-*n*. Therefore, the next command is stored in the first slot of the submission queue 221-*n*. In other words, after the EP (0, SIZEn−1), the pointer indicating the location of the slot where the command is stored is updated to an initial value, and at this time, the cycle counter of the extended pointer is incremented by one and becomes EP (1, 0).

When the command is issued until submission queue 221-*n* becomes a full state, the extended pointer corresponding to the SQTP 4111-*n* and the SQETP 463-*n* is EP (1, SIZEn−2). The extended pointers corresponding to the submission queue 221-*n* (i.e., slots corresponding to real memory) on the RAM 22 of the host 2 are the pointers included in the range of extended pointers from the EP (0, SIZEn−1) to the EP (1, SIZEn−2). The other extended pointers correspond to virtual free slots that do not correspond to the storage area of the RAM 22 among the slots of the virtual submission queue 221-*n*.

Figure 7:
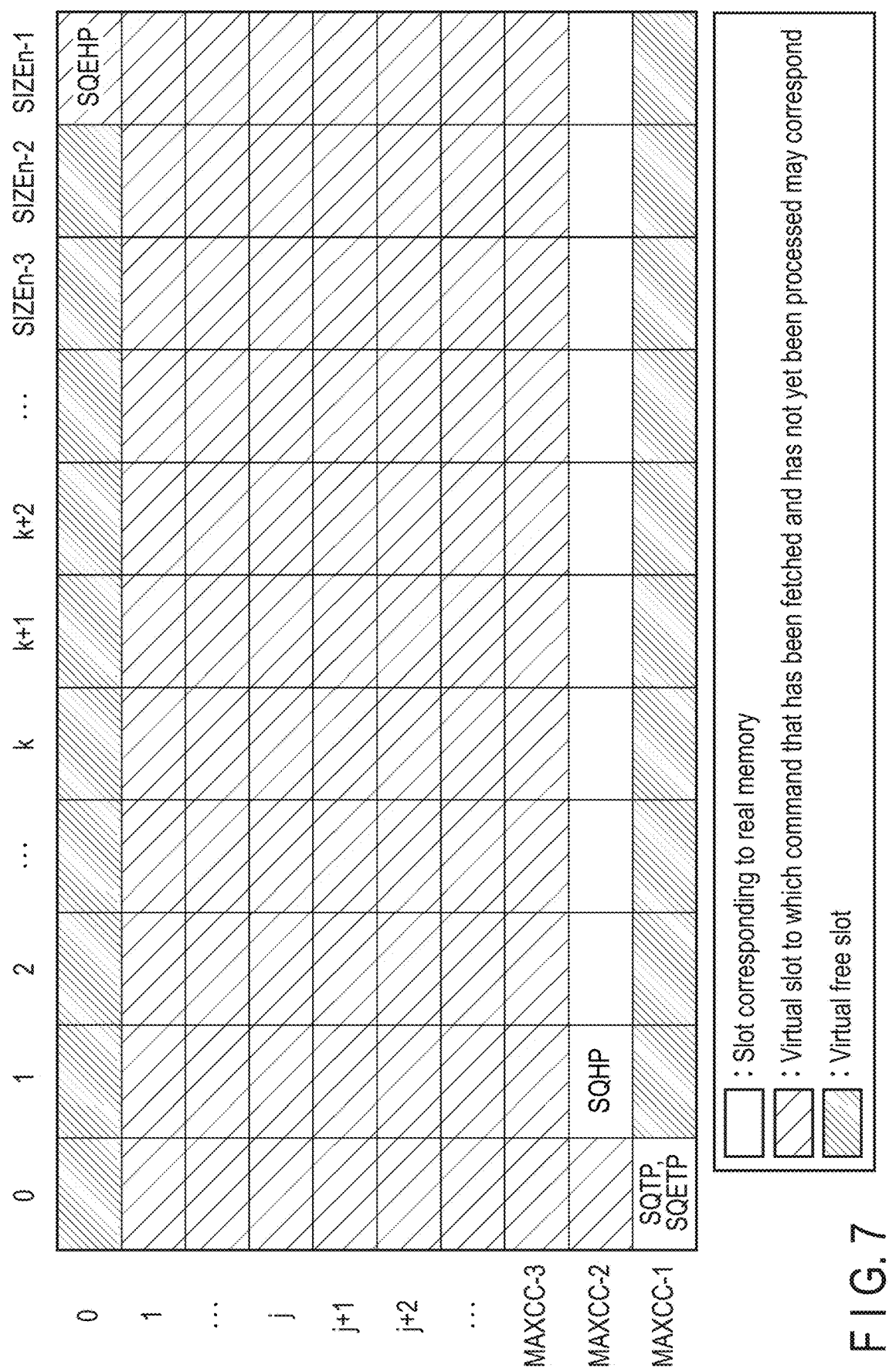
FIG. 7 illustrates a second state example of the virtual submission queue managed in the memory system according to the embodiment.

FIG. 7 illustrates an example of a second state of the virtual submission queue 221-*n* managed in the memory system 3 according to the embodiment. The example of the second state in FIG. 7 shows a point in time after the first state shown in FIG. 6, when the timeout period TOn has elapsed, and before the timeout process is executed. Here, during the timeout period TOn, the MAXFN command has been fetched from the submission queue 221-*n*, and the SIZEn command has been newly issued from the host 2. Therefore, the submission queue 221-*n* remains the full state even after TOn has elapsed.

Specifically, the extended pointer corresponding to the SQEHP is the EP (0, SIZEn−1). The extended pointer corresponding to the SQHP 461-*n* is EP (MAXCC−2, 1). Therefore, the extended pointers included in the range of extended pointers from the EP (0, SIZEn−1) to EP (MAXCC−2, 0) correspond to virtual slots that may correspond to commands that have been fetched and have not yet been processed. The virtual slots, to which the commands that have been fetched and have not yet been processed may correspond, correspond to either the commands that have been fetched and have not yet been processed or the commands that have been fetched and have been already processed.

The extended pointers corresponding to the SQTP 4111-*n* and the SQETP 463-*n* is EP (MAXCC−1, 0). Therefore, the extended pointers included in the range of extended pointers from the EP (MAXCC−2, 1) to the EP (MAXCC−1, 0) correspond to a plurality of slots of the submission queue 221-*n* on the RAM 22 of the host 2.

Next, FIG. 8 illustrates an example of a third state of the virtual submission queue in a case where the extended pointer corresponding to the SQEHP is EP (0, 0), and the maximum number of commands that can be issued by the host 2 is issued to the submission queue 221-*n* during the elapse of the timeout time TOn.

In this case, the extended pointers in the range of extended pointers from the EP (0, 0) to EP (MAXCC−3, 1) correspond to virtual slots to which the commands that have been fetched and have not yet been processed may correspond. The extended pointer corresponding to the SQTP 4111-*n* and the SQETP 463-*n* is EP (MAXCC−2, 1). Therefore, the extended pointers in the range of extended pointers from EP (MAXCC−3, 2) to the EP (MAXCC−2, 1) correspond to a plurality of slots of the submission queue 221-*n* on the RAM 22 of the host 2.

Figure 9:
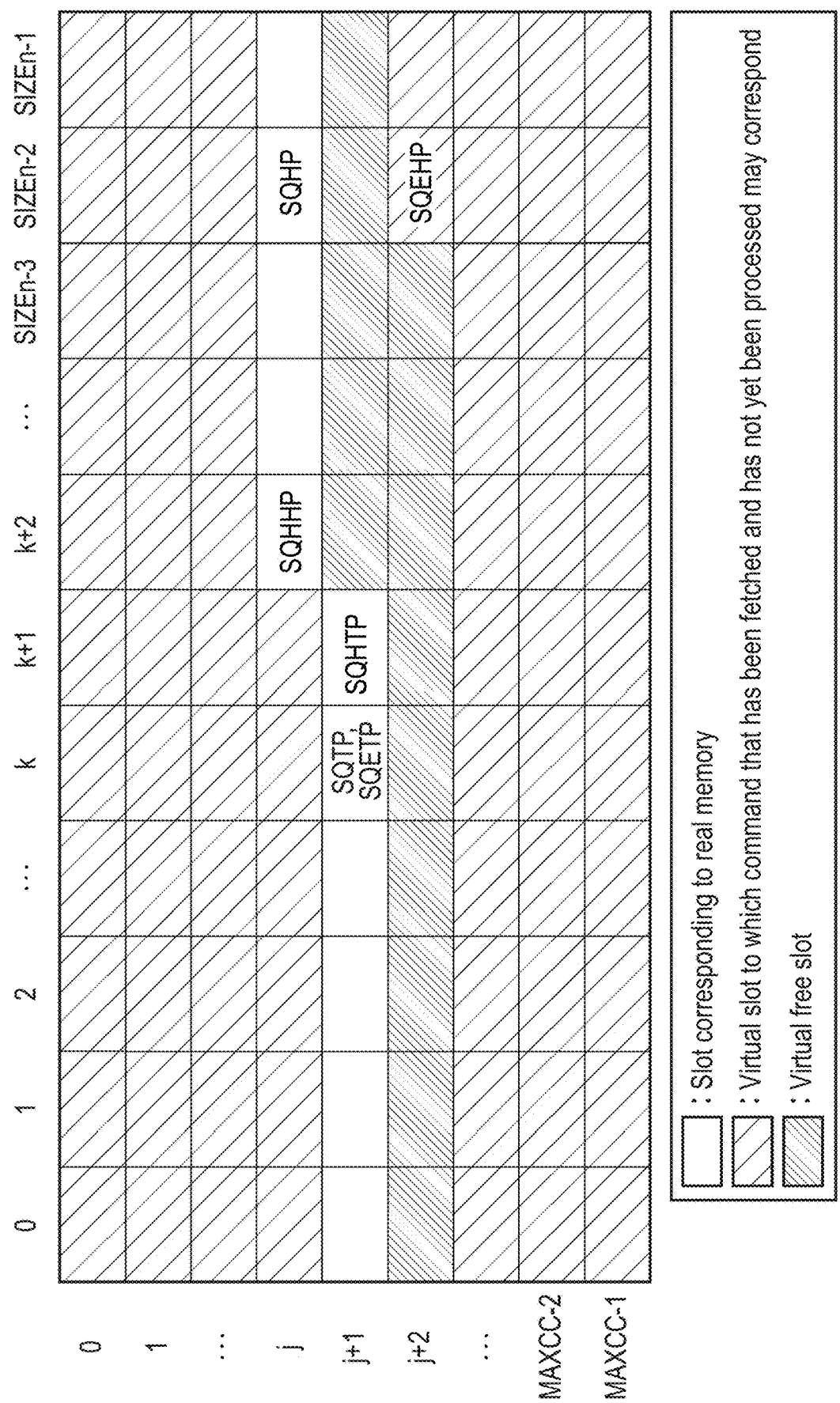
FIG. 9 illustrates a fourth state example of the virtual submission queue managed in the memory system according to the embodiment.

Next, FIG. 9 illustrates an example of a fourth state of the virtual submission queue in a case where the extended pointer corresponding to the SQEHP is EP (j+2, SIZEn−2), and the maximum number of commands that can be issued by the host 2 is issued to the submission queue 221-*n* during the elapse of the timeout time TOn.

First, the extended pointers included in the range of extended pointers from the EP (j+2, SIZEn−2) to EP (MAXCC−1, SIZEn−1) are slots to which commands that have been fetched and have not yet been processed may correspond. When the commands have been stored up to the slot corresponding to the EP (MAXCC−1, SIZEn−1), and the slot to which a command is to be stored next becomes a first slot, the controller 4 maps the first slot to the extended pointer including the updated cycle counter. At this time, since the value of the cycle counter before the update is MAXCC−1 (i.e., the upper limit value), the controller 4 updates the cycle counter to 0 (i.e., the initial value). As a result, the extended pointer corresponding to the slot in which the next command is to be stored becomes EP (0, 0). Thereafter, as commands are issued and commands are fetched, the cycle counter and pointer are sequentially updated.

In FIG. 9, the extended pointer corresponding to the SQHHP 223-*n* managed by the host 2 is EP (j, k+2), and the extended pointer corresponding to the SQHTP 224-*n* managed by the host 2 is EP (j+1, k+1). Since the SQHTP 224-*n* indicates a slot that is one slot prior to the slot indicated by the SQHHP 223-*n*, the submission queue 221-*n* is in a full state from the perspective of the host 2. Therefore, the host 2 determines that new command cannot be issued to the submission queue 221-*n*.

At this time, the controller 4 has fetched one or more ((SIZEn−2)−(k+2)) commands from the submission queue 221-*n* and has updated the SQHP 461-*n*, but has not yet notified the host 2 of the updated SQHP 461-*n* value. Therefore, the extended pointer corresponding to the SQHP 461-*n* is EP (j, SIZEn−2), unlike the SQHHP 223-*n*.

In addition, the host 2 has stored the command in the slot of the submission queue 221-*n* corresponding to EP (j+1, k), but has not yet made write access to the submission queue tail doorbell register. Therefore, the extended pointer corresponding to the SQTP 4111-*n* and the SQETP 463-*n* managed by the controller 4 is the EP (j+1, k), unlike the SQHTP 224-*n*.

As a result, since the slot indicated by the SQTP 4111-*n* and the slot that is one slot prior to the slot indicated by the SQHP 461-*n* are different, the controller 4 does not determine that the submission queue 221-*n* is in the full state.

In fact, the slot in which the next command to be fetched by the controller 4 is stored corresponds to EP (j, SIZEn−2), as indicated by the SQHP, and the slot in which the next command is to be stored by the host 2 after the SQHHP is advanced due to the notification of the SQHP to the host 2 is the EP (j+1, k+1), as indicated by the SQHTP.

In FIG. 9, the extended pointers included in the range of extended pointers from EP (j+2, SIZEn−2) to EP (MAXCC−1, SIZEn−1) and from EP (0, 0) to EP (j, k+1) correspond to virtual slots to which commands that have been fetched and have not yet been processed may correspond. Hereinafter, the range of extended pointers spanning the tail of the extended pointer and the head of the extended pointer, such as from the EP (j+2, SIZEn−2) to the EP (j, k+1), will be referred to as a range including the warp of extended pointer.

Thus, in a case where the extended pointer warps, it may not be possible to directly calculate the determination of whether or not a certain extended pointer is included in the range between two extended pointers. Therefore, considering the warp, two methods for comparing and calculating the extended pointer will be described, respectively.

Figure 10:
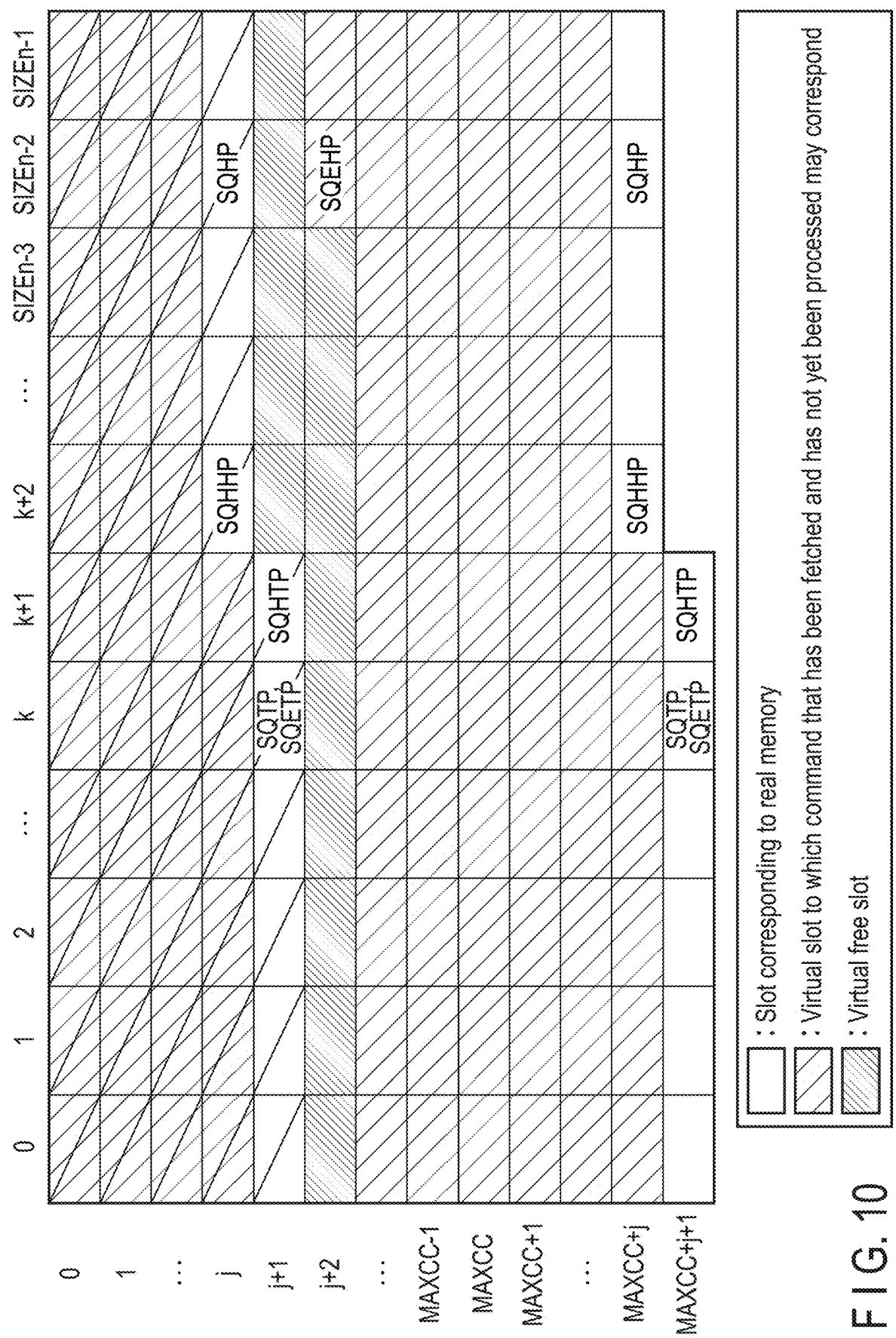
FIG. 10 illustrates a first example of comparing extended pointers in the virtual submission queue managed in the memory system according to the embodiment.

First, the first method is described with reference to FIG. 10. FIG. 10 illustrates a first example of comparing extended pointers in a virtual submission queue managed in the memory system 3 according to the embodiment. The value of each extended pointer in FIG. 10 before applying the first method is the same as the value of the extended pointer shown in FIG. 9.

In the first method, the controller 4 adds MAXCC to the cycle counter of the warping extended pointer from the perspective of the SQEHP. In other words, among the slots of the virtual submission queue, an extended pointer that includes a cycle counter less than the SQEHP cycle counter is considered to be a warped extended pointer. As a result, the cycle counter of the extended pointer after the cycle counter has been updated to an initial value is extended beyond MAXCC.

At this time, the extended pointer whose original cycle counter is 0 (e.g., EP (0, 0)) is calculated as an extended pointer whose cycle counter is MAXCC (e.g., EP (MAXCC, 0)). Then, the SQHHP 223-*n* corresponds to EP (MAXCC+j, k+2), the SQHP 461-*n* corresponds to EP (MAXCC+j, SIZEn−2), the SQTP 4112-*n* corresponds to EP (MAXCC+j+1, k), and the SQHTP 224-*n* corresponds to EP (MAXCC+j+1, k+1). The extended pointers between EP (j+2, SIZEn−2) and EP (MAXCC+j, k+1) correspond to virtual slots to which commands that have been fetched but not yet processed may correspond. The extended pointers included in the range from the EP (MAXCC+j, k+2) to the EP (MAXCC+j+1, k+1) correspond to a plurality of slots in the submission queue 221-*n* on the RAM 22 of the host 2.

Thus, the extended pointers to which the first method is applied are contiguous extended pointers without warping, and therefore the extended pointers can be directly compared and calculated. However, the upper limit value of the cycle counter of the extended pointers to which the first method is applied may be approximately twice the value of the original cycle counter. Therefore, a field larger in size than the original cycle counter field would be needed to temporarily store the extended pointer used for the calculation.

Figure 11:
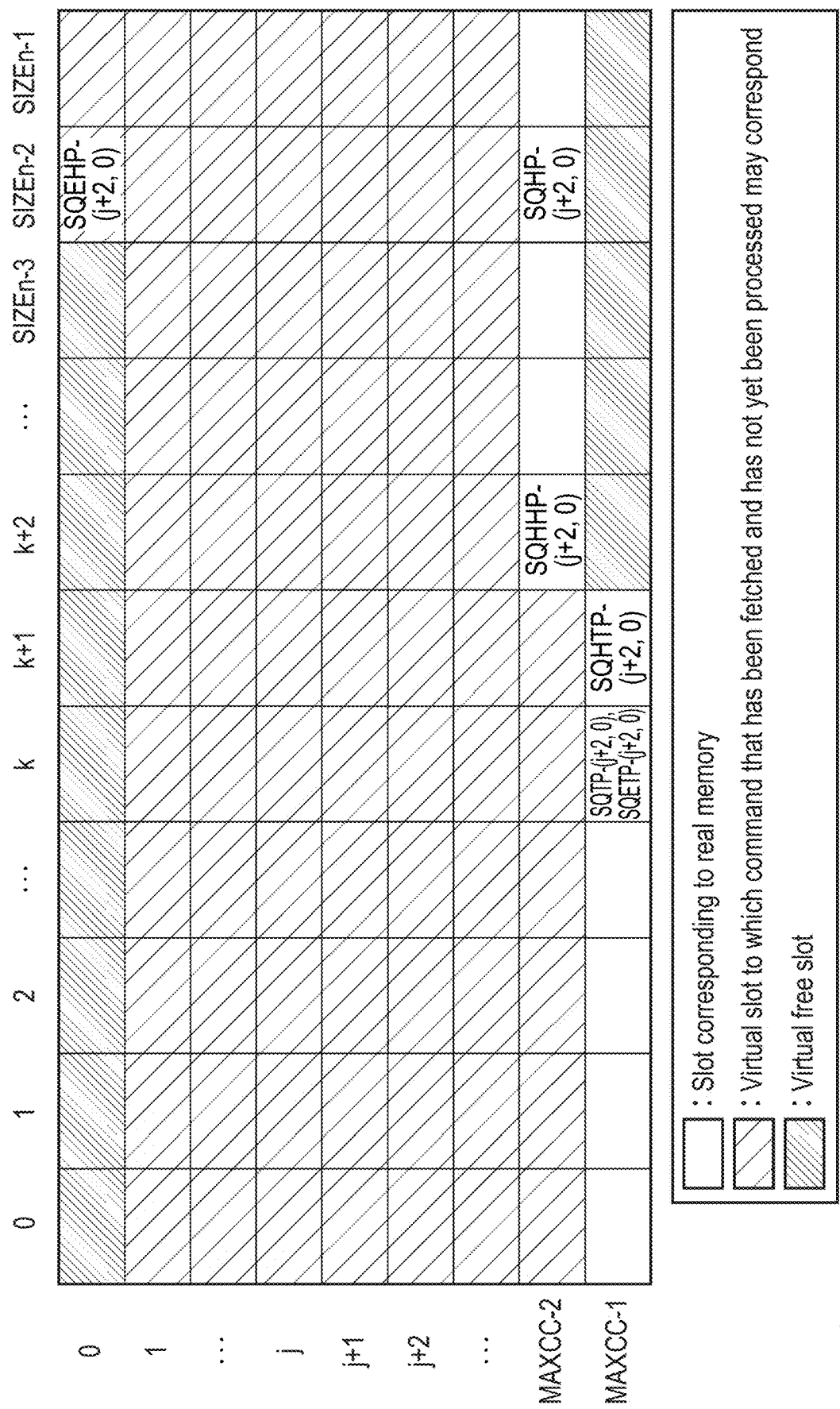
FIG. 11 illustrates a second example of comparing the extended pointers in the virtual submission queue managed in the memory system according to the embodiment.

Next, the second method is described with reference to FIG. 11. In the second method, the cycle counters of other extended pointers are subtracted based on the cycle counter of the SQEHP. FIG. 11 illustrates a second example of comparing extended pointers in a virtual submission queue managed in the memory system 3 according to the embodiment.

The controller 4 subtracts the value of the cycle counter included in the SQEHP before calculation from the cycle counter of each extended pointer. Specifically, j+2, which is the cycle counter of the SQEHP, is subtracted from the cycle counter of each extended pointer. This allows the other extended pointers to be shifted so that the cycle counter of the SQEHP is shifted to its initial value.

The extended pointer of the SQEHP after subtraction (i.e., SQEHP−(j+2, 0)) becomes EP (0, SIZEn−2). The SQEHP after subtraction includes an initial value cycle counter.

In the extended pointer of the SQHHP 223-*n* after subtraction (i.e., SQEHP−(j+2, 0)), the cycle counter underflows (i.e., EP (−2, k+2)). Therefore, as reverse processing when the extended pointer is cycled, MAXCC is added to the cycle counter. Thus, SQHHP 223-*n* after subtraction becomes EP (MAXCC−2, k+2). Note that since the SQHHP is in the host 2, the memory system 3 is not aware of it, so this operation is not actually performed.

Since the extended pointer of the SQHP 461-*n* after the subtraction (i.e., SQHP−(j+2, 0)) underflows, MAXCC is further added to the cycle counter, so that the extended pointer becomes EP (MAXCC−2, SIZEn−2).

Since the extended pointer of the SQTP 4111-*n* after the subtraction (i.e., SQTP−(j+2, 0)) underflows, MAXCC is further added to the cycle counter, so that the extended pointer becomes EP (MAXCC−1, k).

Since the extended pointer of the SQHTP 224-*n* after subtraction (i.e., SQHTP−(j+2, 2)) underflows, MAXCC is further added to the cycle counter, so that the extended pointer becomes EP (MAXCC−1, k+1). Note that since the SQHTP is in the host 2, the memory system 3 is not aware of it, so this operation is not actually performed.

Thus, the extended pointers to which the second method is applied are contiguous extended pointers without warping, and therefore the extended pointers can be directly compared and calculated. The maximum value of the extended pointers to which the second method is applied is MAXCC−1, which is the same as before the subtraction. Therefore, the size of the extended pointers does not change when the second method is applied.

In a case where two or more extended pointers are compared in the following description, the first or second method described with reference to FIG. 10 and FIG. 11 may be used.

Next, an example of a configuration of fetch command management table 464-$n$ will be described. FIG. 12 illustrates an example of a configuration of the fetch command management table 464-$n$ used in the memory system 3 according to the embodiment. Here, the fetch command management table 464-$n$ used in a case where the extended pointer corresponding to each command is managed is shown.

The fetch command management table 464-$n$ corresponds to the submission queue 221-$n$. The fetch command management table 464-$n$ includes a plurality of entries, each corresponding to one command. The number of entries included in the fetch command management table 464-$n$ is, for example, MAXFN (the maximum value of the number of commands that can be fetched while the timeout time TOn elapses). Each entry stores the contents of the submission queue entry and the extended pointer.

The contents of the submission queue entry are information indicating the contents of the corresponding command. For example, the contents of the submission queue entry include information indicating the type of command, a logical address specified by a command, a command ID, and a CID. In a case where the corresponding command is a write command, the contents of the submission queue entry include, for example, information indicating the write command, a logical address corresponding to write data, an address on the RAM 22 where the write data is stored, the CID, etc. In a case where the corresponding command is a read command, the contents of the submission queue entry include, for example, information indicating the read command, a logical address corresponding to read data, an address on the RAM 22 where the read data is to be stored, the CID, etc.

The extended pointer indicates the slot in the submission queue 221-$n$ where the corresponding command was stored. The extended pointer includes the SQHP 461-$n$ at the time the command was fetched, and a cycle counter. As this cycle counter, in a case where the SQTP 4111-$n$ indicates a slot later than the SQHP 461-$n$, the same value as the cycle counter included in the SQETP 463-$n$ is used, and, in a case where the SQTP 4111-$n$ indicates a slot before the SQHP 461-$n$, a value subtracted by one from the cycle counter included in the SQETP 463-$n$ is used.

When the controller 4 fetches one command from the submission queue 221-$n$, it selects one free entry among the plurality of entries included in the fetch command management table 464-$n$. The controller 4 then stores the contents of the submission queue entry and the extended pointer associated with the fetched command in the selected entry. Then, the SQHP is advanced by one.

When processing of the fetched command is completed, the controller 4 invalidates the entry in the fetch command management table 464-$n$ corresponding to that command. When invalidating an entry in the fetch command management table 464-$n$, the controller 4 deletes the contents of that entry. Alternatively, the controller 4 has information in each entry indicating whether or not the entry in the fetch command management table 464-$n$ is valid, and by updating the entry to a value indicating invalidity, the controller 4 may invalidate the entry and set it to a state where information relating to a new command can be stored. Therefore, the valid entries in the fetch command management table 464-$n$ correspond to commands that have been fetched and have not yet been processed. In the following, a case will be described in which information stored in the entry in the fetch command management table 464-$n$ is deleted when the entry is invalidated.

Next, an example of a configuration of time slot management table 471-$n$ will be described. FIG. 13 illustrates an example of a configuration of the time slot management table 471-$n$ used in the memory system 3 according to the embodiment.

The time slot management table 471-$n$ corresponds to the submission queue 221-$n$. The time slot management table 471-$n$ includes a plurality of entries, each corresponding to one time slot. For example, in a case where the timeout time TOn is expressed as Mn×Tn, time slot management table 471-$n$ has (Mn+1) entries. Each entry stores the SQETP 463-$n$ for each Tn. The initial value of each entry is, for example, the initial value of the extended pointer. The initial value of the extended pointer includes, for example, a cycle counter indicating 0 and a pointer indicating the slot SLT0.

For example, when Tn has elapsed since the start of the operation, the controller 4 selects the entry with line number 0 as the entry in which the extended pointer corresponding to a first time slot TSn,1 is to be stored. Then, after temporarily saving the information indicating the extended pointer stored in that selected entry in advance to the first EP 465-$n$ of the SRAM 46, the controller 4 stores the current SQETP 463-$n$ in the entry with line number 0. In other words, the SQETP 463-$n$ stored in the entry of the time slot management table 471-$n$ is the SQETP 463-$n$ at the end time of the time slot corresponding to this entry.

Thereafter, each time Tn elapses, the controller 4 selects a new entry. The controller 4 stores the SQETP 463-$n$ at that time in the selected entry as an extended pointer corresponding to the time slot at that time.

When (Mn+1)×Tn has elapsed since the start of the operation, the controller 4 selects the entry with line number Mn as the entry in which the extended pointer corresponding to a time slot TSn, Mn+1 is to be stored. Then, after temporarily saving the information indicating the extended pointer stored in that selected entry in advance to the first EP 465-$n$ of the SRAM 46, the controller 4 stores the current SQETP 463-$n$ in the entry with line number Mn. Here, the extended pointer to be saved in the SPAM 46 is the initial value.

When (Mn+1)×Tn has elapsed since the start of the operation, the timeout time TOn (=Mn×Tn) has elapsed from the end time of the first time slot TSn,1. At this time, the controller 4 specifies time slot TSn,1 as the time slot of timeout target. In a case where a timeout time factor is Mn and the number of entries included in the time slot management table 471-$n$ is Mn+1, after the elapse of (Mn+1)×Tn from the start of the operation, the controller 4 may determine that the next entry of the entry in which the SQETP 463-$n$ is newly stored is the entry corresponding to the time slot of timeout target.

Then, the controller 4 acquires the extended pointer corresponding to the time slot that is one time slot prior to the time slot of timeout target (hereinafter referred to as a first extended pointer (EP)), which is the extended pointer saved in the SRAM 46, and the extended pointer corresponding to the time slot of timeout target (hereinafter, a second extended pointer (EP)) from the entry corresponding to the time slot of timeout target. In a case where, for example, the first extended pointer and the second extended pointer are different, the controller 4 searches for a command corresponding to the time slot of timeout target. The command corresponding to the time slot of timeout target is a command that was stored in a slot included in the range from the slot indicated by the first extended pointer to the slot that is one slot prior to the slot indicated by the second extended pointer.

In a case where the first extended pointer and the second extended pointer are the same, no command has been issued during the time slot of timeout target. Therefore, the controller 4 determines that the timeout process is unnecessary.

Next, an example of a configuration of the time slot management table 473-$n$ when the time advances to S×Tn (S is an integer greater than Mn+1) will be described. FIG. 14 illustrates an example of the first state of the time slot management table 471-$n$ used in the memory system 3 according to the embodiment.

In FIG. 14, the entry corresponding to line number 0 corresponds to time slot TSn, S−2 and stores the SQETP 463-$n$ at time (S−2)×Tn.

The entry corresponding to line number 1 corresponds to time slot TSn, S−1 and stores the SQETP 463-$n$ at time (S−1)×Tn.

The entry corresponding to line number 2 corresponds to time slot TSn, S and stores the SQETP 463-$n$ at time S×Tn.

The entry corresponding to line number 3 corresponds to time slot TSn, S−Mn and stores the SQETP 463-$n$ at time (S−Mn)×Tn.

The entry corresponding to line number 4 corresponds to time slot TSn, S−Mn+1 and stores the SQETP 463-$n$ at time (S−Mn+1)×Tn.

The entry corresponding to line number Mn−1 corresponds to time slot TSn, S−4 and stores the SQETP 463-$n$ at time (S−4)×Tn.

The entry corresponding to line number Mn corresponds to time slot TSn, S−3 and stores the SQETP 463-$n$ at time (S−3)×Tn.

At this time, the entry corresponding to the latest time slot is the entry corresponding to the line number 2. The time slot of timeout target is TSn, S−Mn, and the entry corresponding to the time slot of timeout target is the entry corresponding to the line number 3. The controller 4 acquires the extended pointer stored in the entry corresponding to the line number 3 as the second EP. In addition, before the extended pointer corresponding to time slot TSn, S is stored in the entry corresponding to the line number 2, the controller 4 saves the extended pointer of time slot TSn, S−Mn−1 stored in the entry corresponding to the line number 2 as the first EP in the SPAM 46.

In a case where the first EP and the second EP are the same value, the controller 4 determines that there was no command issued during TSn, S−Mn of timeout target. In addition, in a case where the first EP and the second EP are different values, the controller 4 identifies the command corresponding to the extended pointer included in the range from the first EP to the extended pointer that is one EP prior to the second EP, and executes a timeout process to aborting the identified command. The command that was (or is) stored in the slot of the virtual submission queue indicated by a certain extended pointer is referred to as the command corresponding to that extended pointer.

Next, an example of a configuration of the time slot management table 471-$n$ is described in a case where one command is issued in time slot TSn, S−Mn, then the time advances to S×Tn without a subsequent command being issued. FIG. 15 illustrates an example of the second state of the time slot management table 471-$n$ used in the memory system 3 according to the embodiment.

In FIG. 15, the entry corresponding to the line number 0 corresponds to time slot TSn, S−2 and stores the SQETP 463-$n$ at time (S−2)×Tn. The value of the extended pointer stored in this entry is X. X includes, for example, a cycle counter indicating C and a pointer indicating P.

The entry corresponding to the line number 1 corresponds to time slot TSn, S−1 and stores the SQETP 463-$n$ at time (S−1)×Tn. The value of the extended pointer stored in this entry is X.

The entry corresponding to the line number 2 is the entry that is updated at time S×Tn. The entry corresponding to the line number 2 before the update corresponds to time slot TSn, S−(Mn+1) and stores the SQETP 463-$n$ at time (S−(Mn+1))×Tn. The value of the extended pointer stored in the entry before the update is X−1. X−1 includes, for example, a cycle counter indicating C and a pointer indicating (P−1). The extended pointer before the update, which was stored in the entry corresponding to the line number 2, is temporarily stored in the SRAM 46 when the entry is updated. The entry corresponding to the line number 2 after the update corresponds to time slot TSn, S and stores the SQETP 463-$n$ at time S×Tn. The value of the extended pointer stored in the entry after the update is X.

The entry corresponding to the line number 3 corresponds to time slot TSn, S−Mn and stores the SQETP 463-$n$ at time (S−Mn)×Tn. The value of the extended pointer stored in this entry is X.

The entry corresponding to the line number 4 corresponds to time slot TSn, S−Mn+1 and stores the SQETP 463-$n$ at time (S−Mn+1)×Tn. The value of the extended pointer stored in this entry is X.

The entry corresponding to the line number Mn−1 corresponds to time slot TSn, S−4 and stores the SQETP 463-$n$ at time (S−4)×Tn. The value of the extended pointer stored in this entry is X.

The entry corresponding to the line number Mn corresponds to time slot TSn, S−3 and stores the SQETP 463-$n$ at time (S−3)×Tn. The value of the extended pointer stored in this entry is X.

At this time, the entry corresponding to the latest time slot is the entry corresponding to the line number 2. The time slot of timeout target is TSn, S−Mn, and the entry corresponding to the time slot timeout target is the entry corresponding to line number 3. The controller 4 acquires the extended pointer stored in the entry corresponding to the line number 3 as the second EP. The controller 4 also acquires the extended pointer stored in the entry corresponding to the line number 2 before the update as the first EP from the SPAM 46. This first EP corresponds to time slot TSn, S−(Mn+1). The controller 4 determines that the command corresponding to the extended pointer included in the range from the first EP to the extended pointer that is one EP prior to the second EP is the command of timeout target. Here, the value of the first EP is X−1, and the value of the second EP is X. Therefore, one command corresponding to X−1 (i.e., the first EP) is the command corresponding to time slot TSn, S−(Mn+1). Only one command corresponding to the first EP is a command that may be a target of the timeout process.

The controller 4 determines whether or not there is an EP that is greater than or equal to the first EP and less than or equal to an EP that is one EP prior to the second EP among the extended pointers stored in the fetch command management table 464-$n$. Here, the controller 4 determines whether or not information relating to a command corresponding to the EP that is greater than or equal to the first EP and less than or equal to an EP that is one EP prior to the second EP is stored in the fetch command management table 464-$n$. The command for which information is stored in the fetch command management table 464-$n$ is the command that has been fetched from the submission queue 221-$n$ and has not yet been processed. Therefore, the controller 4 executes a timeout process with respect to the corresponding command. As a result, the controller 4 aborts the corresponding commands. The processing of the aborted command is interrupted, and a completion response including information indicating the abort is issued to the host 2.

In a case where the command corresponding to the EP is still stored in the submission queue 221-$n$, the controller 4 fetches the corresponding command. Then, the controller 4 aborts the fetched command. In a case where the EP is greater than or equal to the extended pointer corresponding to the current SQHP, the controller 4 determines that the command corresponding to the EP is still stored in the submission queue 221-$n$, and the command of timeout target is stored in the submission queue 221-$n$. Note that, in a case where the EP is examined one by one, starting from the first EP, when the EP becomes the extended pointer corresponding to the current SQHP at a certain point, thereafter all EPs up to one EP prior to the second EP are stored in the submission queue 221-$n$. Therefore, the determination need not be repeated.

Next, as a method of searching for a command corresponding to the time slot to be timed out, a case will be described in which the correspondence between the command and the information indicating the time slot is managed in the fetch command management tables 464-0, . . . , 464-$v$. FIG. 16 illustrates a modification example of the fetch command management table 464-$n$ used in the memory system 3 according to the embodiment. Here, each of a plurality of entries in the fetch command management table 464-$n$ stores a line number of the time slot management table 471-$n$ corresponding to a time slot, corresponding to each commands.

The fetch command management table 464-$n$ corresponds to the submission queue 221-$n$. The fetch command management table 464-$n$ includes the plurality of entries, each entries corresponding to one command. The number of entries in the fetch command management table 464-$n$ is, for example, MAXFN. Each entry stores the contents of the submission queue entry and the line number of the time slot management table 471-$n$.

The contents of the submission queue entry is information indicating the contents of the corresponding command.

The line number of the time slot management table 471-$n$ is information indicating the line number of the time slot management table 471-$n$ corresponding to the time slot that includes the time when the corresponding command was issued to the submission queue 221-$n$.

When the controller 4 fetches one command from submission queue 221-$n$, the controller 4 selects one free entry from among the plurality of entries in the fetch command management table 464-$n$. The controller 4 maps the fetched command to the selected entry.

The controller 4 stores information indicating the contents of the fetched command and the line number of the time slot management table 471-$n$ in the mapped entry. Here, the controller 4 retains the stored line number of the time slot management table 471-$n$ during startup, and its initial value is the first line number of the lines of the time slot management table 471-$n$ to be written. This line number is used by the controller 4 to identify the line number in the time slot management table 471-$n$ when subsequent commands are fetched. Specifically, the controller 4 determines whether or not an extended pointer corresponding to the fetched command is smaller than an extended pointer corresponding to the retained line number in the time slot management table 471-$n$. In a case where the extended pointer corresponding to the fetched command is smaller than the extended pointer corresponding to the retained line number in the time slot management table 471-$n$, the controller 4 determines that the fetched command corresponds to the same time slot as the previously fetched command. Then, the controller 4 stores the retained line number of the time slot management table 471-$n$ in the mapped entry. In a case where the extended pointer corresponding to the fetched command is the extended pointer corresponding to the retained line number in the time slot management table 471-$n$, the controller 4 acquires an extended pointer corresponding to a line number that is the retained line number in the time slot management table 471-$n$ plus one, and, again, compares it with the extended pointer corresponding to the fetched command. The controller 4 continues this until the extended pointer corresponding to the fetched command is smaller than the extended pointer corresponding to the line number in the time slot management table 471-$n$, and when this condition is met, stores a line number that is one line number prior to the line number in the time slot management table 471 in the mapped entry. The controller 4 also updates the retained initial value of line number in time slot management table 471-$n$.

When the controller 4 completes processing the fetched command, it invalidates the entry in the fetch command management table 464-$n$ corresponding to that command. Therefore, the valid entries in the fetch command management table 464-$n$ correspond to commands that have been fetched and have not yet been processed.

By using such the fetch command management table 464-$n$, the size of the storage area required for the fetch command management table 464-$n$ can be reduced compared to the case where the extended pointer is stored in each entry. This is because the size of the field indicating the line number in the time slot management table 471-$n$ is smaller than the size of the field of the extended pointer. Furthermore, in the case of identifying the command of timeout target, the controller 4 does not determine whether or not the EP corresponding to each command is in the range from the first EP to one EP prior to the second EP; however, determines whether or not the line number corresponding to each command matches the line number corresponding to the time slot of timeout target. Therefore, the controller 4 does not need to execute the extended pointer comparison using the first method or the second method described above, and thus can execute the timeout process at a higher speed.

However, in the case of using such the fetch command management table 464-$n$, the controller 4 needs to convert the extended pointer to a line number in the time slot management table 471-$n$ each time a command is fetched. Therefore, the number of times for accessing to the time slot management table 471-$n$ increases, and the line number of the time slot management table 471-$n$ corresponding to the previously fetched command is temporarily retained, which may cause the resources required for the command fetch processing to increase.

Next, the time slots corresponding to each of the plurality of slots in the virtual submission queue 221-*n* will be explicitly described. FIG. 17 illustrates an example of the relationship between a virtual submission queue and a plurality of time slots managed in the memory system 3 according to the embodiment.

The SQ extended head pointer (SQEHP) indicates EP (j+2, SIZEn−2). The EHP indicates the first of the virtual slots that may correspond to a command that has been fetched and has not yet been processed. However, the command itself of the slot indicated by the EHP is fetched and uncompleted, and the commands of the slots ahead are those that have been fetched but may include both completed and uncompleted commands. When the command in the slot indicated by the EHP is completed, the EHP is updated to the EP indicating the slot corresponding to the next fetched and uncompleted command. In a case where there are no more fetched and uncompleted commands, it proceeds to the same location as the SQHP. Here, if a new command is fetched, only the SQHP advances, and the EHP again indicates the slot corresponding to the fetched and uncompleted command.

The SQ host head pointer (SQHHP) corresponds to EP (j, k+2). The SQHHP is an SQHP managed by the host 2. The SQHHP indicates a storage location of an earliest slot which is still to be retained data by the host 2, among the storage areas corresponding to submission queue 221-*n* on the RAM 22.

The SQ head pointer (SQHP) corresponds to EP (j, SIZEn−2). The SQHP is managed by the controller 4. The HP indicates a slot in which the next command to be fetched is stored.

The SQ extended tail pointer (SQETP) indicates EP (j+1, k). The SQETP is an extended pointer corresponding to the SQTP managed by the controller 4. The SQETP indicates a slot in which the next command to be issued is to be stored. Therefore, from the perspective of the controller 4, a slot that is one slot prior to the slot indicated by the SQETP is the slot in which the latest command is stored.

The SQ host tail pointer (SQHTP) corresponds to EP (j+1, k+1). The SQHTP is an SQTP managed by the host 2 and indicates the slot in which the next command to be issued is to be stored. Since the SQHTP indicates a slot that is one slot prior to the slot indicated by the SQHHP, submission queue 221-*n*, from the perspective of the host 2, is in a full state. Therefore, the SQHTP in FIG. 17 indicates a slot in which no command is stored among the plurality of slots of submission queue 221-*n* in the full state.

Time slot TSn, N−Mn is a time range from the elapse of time (t+(N−Mn−1))×Tn to time (t+(N−Mn))×Tn. The commands corresponding to time slot TSn, N−Mn are the commands stored in the slots included in the range from EP (j+2, SIZEn−2) to EP (j+3, k−1).

Time slot TSn, N−Mn+1 is a time range from the elapse of time (t+(N−Mn))×Tn to time (t+(N−Mn+1))×Tn. The commands corresponding to time slot TSn, N−Mn+1 are the commands stored in the slots included in the range from EP (j+3, k) to EP (j+3, SIZEn−2).

Time slot TSn, N−Mn+2 is a time range from the elapse of time (t+(N−Mn+1))×Tn to time (t+(N−Mn+2))×Tn. The first issued command among the commands corresponding to time slot TSn, N−Mn+2 is the command stored in the slot indicated by EP (j+3, SIZEn−1).

Time slot TSn, K−9 is a time range from the elapse of time (t+(K−10))×Tn to time (t+(K−9))×Tn. The last issued command among the commands corresponding to time slot TSn, K−9 is the command stored in the slot indicated by EP (MAXCC−2, 0).

In a time range corresponding to time slot TSn, K−8, no command has been issued. Therefore, in FIG. 17, there is no EP corresponding to time slot TSn, K−8.

Time slot TSn, K−7 is a time range from the elapse of time (t+(K−8))×Tn to time (t+(K−7))×Tn. The commands corresponding to time slot TSn, K−7 are the commands stored in the slots included in the range from EP (MAXCC−2, 1) to EP (MAXCC−2, k+1).

In a time range corresponding to time slot TSn, K−6, no command has been issued. Therefore, in FIG. 17, there is no EP corresponding to time slot TSn, K−6.

Time slot TSn, K−5 is a time range from the elapse of time (t+(K−6))×Tn to time (t+(K−5))×Tn. The commands corresponding to time slot TSn, K−5 are the commands stored in the slots included in the range from EP (MAXCC−2, k+2) to EP (MAXCC−1, 1).

Time slot TSn, K−4 is a time range from the elapse of time (t+(K−5))×Tn to time (t+(K−4))×Tn. The commands corresponding to time slot TSn, K−4 are the commands stored in the slots included in the range from EP (MAXCC−1, 2) to EP (MAXCC−1, k+3).

Time slot TSn, K−3 is a time range from the elapse of time (t+(K−4))×Tn to time (t+(K−3))×Tn. The commands corresponding to time slot TSn, K−3 are the commands stored in the slots included in the range from EP (MAXCC−1, SIZEn−3) to EP (0, k).

Time slot TSn, K−2 is a time range from the elapse of time (t+(K−3))×Tn to time (t+(K−2))×Tn. The commands corresponding to time slot TSn, K−2 are the commands stored in the slots included in the range from EP (0, k+1) to EP (1, 0).

Time slot TSn, K−1 is a time range from the elapse of time (t+(K−2))×Tn to time (t+(K−1))×Tn. The commands corresponding to time slot TSn, K−1 are the commands stored in the slots included in the range from EP (1, 1) to EP (1, SIZEn−3).

Time slot TSn, K is a time range from the elapse of time (t+(K−1))×Tn to time (t+K)×Tn. The first issued command among the commands corresponding to time slot TSn, K is the command stored in the slot indicated by EP (1, SIZEn−2).

Time slot TSn, N−2 is a time range from the elapse of time (t+(N−3))×Tn to time (t+(N−2))×Tn. The last issued command among the commands corresponding to time slot TSn, N−2 is the command stored in the slot indicated by EP (j, 1).

Time slot TSn, N−1 is a time range from the elapse of time (t+(N−2))×Tn to time (t+(N−1))×Tn. The commands corresponding to time slot TSn, N−1 are the commands stored in the slots included in the range from EP (j, 2) to EP (j, SIZEn−1).

Time slot TSn, N is a time range from the elapse of time (t+(N−1))×Tn to time (t+N)×Tn. The commands corresponding to time slot TSn, N are the commands stored in the slots included in the range from EP (j+1, 0) to EP (j+1, k−1).

Time slot TSn, N+1, not shown, is a time range from the elapse of time (t+N)×Tn to time (t+N+1)×Tn. If the host 2 writes the value of the SQHTP in EP (j+1, k+1) to the SQTP doorbell register by time (t+N+1)×Tn, the command included in EP (j+1, k) becomes the command corresponding to time slot TSn, N+1. If writing to the doorbell register is delayed, the command will be the one corresponding to the time slot corresponding to that time.

Next, the search for commands in the timeout process will be described. FIG. 18 illustrates an example of the management of issued commands in the memory system 3 according to the embodiment. In FIG. 18, for explanation, for each entry in the fetch command management table 464-$n$, both the line number LN of the time slot management table 471-$n$ and the extended pointer EP are shown. The line number LN(N) is a line number indicating the entry in time slot management table 471-$n$ corresponding to time slot TSn, N. The extended pointer EP(X) stored in the entry of the fetch command management table 464-$n$ is an extended pointer indicating the slot SLT X of the virtual submission queue 221-$n$. It is sufficient if the entry in the fetch command management table 464-$n$ retains either the line number or the extended pointer. Also, a time slot number indicating the time slot may be used instead of the line number used in FIG. 18, or a slot number indicating the slot in the virtual submission queue 221-$n$ may be used instead of the extended pointer.

In FIG. 18, time slot management table 471-$n$ has Mn+1 entries. The extended pointer EP(N) stored in the entry in the time slot management table 471-$n$ is the SQETP 463-$n$ at the end time of time slot TSn, N.

The entry in line 0 before the update of the time slot management table 471-$n$ corresponds to time slot TSn, N−1. The extended pointer stored in the entry in line 0 before the update is EP(N−1), which indicates the SQETP 463-$n$ at the end time of time slot TSn, N−1. EP(N−1) indicates slot SLT X−3 in the virtual submission queue 221-$n$. Also, the entry in line 0 after the update corresponds to time slot TSn, N+Mn. The extended pointer stored in the entry in line 0 after the update is EP(N+Mn), which indicates the SQETP 461-$n$ at the end time of time slot TSn, N+Mn. EP(N+Mn) indicates slot SLT Z of the virtual submission queue 221-$n$.

The entry in line 1 corresponds to time slot TSn, N. The extended pointer stored in the entry in line 1 is EP(N), which indicates the SQETP 461-$n$ at the end time of time slot TSn, N. EP(N) indicates slot SLT X in the virtual submission queue 221-$n$.

The entry in line 2 corresponds to time slot TSn, N+1. The extended pointer stored in the entry in line 2 is EP(N+1), which indicates the SQETP 463-$n$ at the end time of time slot TSn, N+1. The entry in line 3 corresponds to time slot TSn, N+2. The extended pointer stored in the entry in line 3 is EP(N+2), which indicates the SQETP 463-$n$ at the end time of time slot TSn, N+2. The entry in line 3 corresponds to time slot TSn, N+2.

The entry in line Mn corresponds to time slot TSn, N+Mn−1. The extended pointer stored in the entry in line Mn is EP(N+Mn−1), which indicates the SQETP 463-$n$ at the end time of time slot TSn, N+Mn−1.

The fetch command management table 464-$n$ retains information relating to commands that have been fetched from the submission queue 221-$n$ and have not yet been processed. Here, both the line number and the extended pointer of the time slot management table 471-$n$ that may be stored in an entry in the fetch command management table 464-$n$ are described.

The command corresponding to a first entry in the fetch command management table 464-$n$ is a read command. Fetch data includes information indicating that it is a read command and an LBA range from LBA G to LBA H. The first entry retains either line number LN(N+5), which is a line number of the time slot management table 471-$n$ corresponding to time slot TSn, N+5, or extended pointer EP(X+3), which indicates slot SLT X+3 of the virtual submission queue 221-$n$.

The command corresponding to a second entry in the fetch command management table 464-$n$ is a read command. Fetch data includes information indicating that it is a read command and a logical address range from LBA A to LBA B. The second entry retains either line number LN(N), which is a line number of the time slot management table 471-$n$ corresponding to time slot TSn, N, or extended pointer EP(X−3), which indicates slot SLT X−3 of the virtual submission queue 221-$n$.

The command corresponding to a third entry in the fetch command management table 464-$n$ is a write command. Fetch data includes information indicating that it is a write command and a logical address range from LBA C to LBA D. The third entry retains either line number LN(N), which is a line number of the time slot management table 471-$n$ corresponding to time slot TSn, N, or extended pointer EP(X−1), which indicates slot SLT X−1 of the virtual submission queue 221-$n$.

The command corresponding to a fourth entry in the fetch command management table 464-$n$ is a write command. Fetch data includes information indicating that it is a write command and a logical address range from LBA E to LBA F. The fourth entry retains either line number LN(N+2), which is a line number of the time slot management table 471-$n$ corresponding to time slot TSn, N+2, or extended pointer EP(X+1), which indicates slot SLT X+1 of the virtual submission queue 221-$n$.

Also, the plurality of slots from slots SLT X−3 to SLT Z are slots in the virtual submission queue 221-$n$ indicated by the extended pointer.

The slot SLT X−3 is a slot indicated by extended pointer EP(N−1) corresponding to time slot TSn, N−1. The slot is a virtual slot at the head of a command that has been fetched from the submission queue 221-$n$ and has not yet been processed, and is a virtual slot to which a command that has been fetched and has not yet been processed may correspond thereafter. In other words, it is also a virtual slot to which a completed command may correspond thereafter.

The slot SLT X is a slot indicated by extended pointer EP(N) corresponding to time slot TSn, N.

The slot SLT Y is a slot indicated by the SQHP 461-$n$.

The slot SLT Z is a slot indicated by the extended pointer EP(N+Mn) corresponding to the SQTP 4111-$n$ and time slot TSn, N+Mn. At the time of this drawing, it is still a free state from the perspective of the memory system 3 since it is a slot indicated by the SQTP.

At the end time of time slot TSn, N+Mn, the controller 4 specifies time slot TSn, N as the time slot of timeout target. The controller 4 executes timeout processes for commands that have not yet been processed among the commands corresponding to time slot TSn, N.

First, a case is described in which the extended pointer stored in the fetch command management table 464-$n$ is used to identify the command of timeout target. The controller 4 acquires the saved extended pointer EP(N−1) corresponding to time slot TSn, N−1 that is one time slot prior to the time slot TSn, N of timeout target, and extended pointer EP(N) corresponding to time slot TSn, N of timeout target. Then, the controller 4 identifies the command of timeout target using the acquired extended pointer EP(N) and extended pointer EP(N−1).

The controller 4 identifies a range of virtual slots that may correspond to commands that have not yet been processed. This range is from extended pointer EP(N−1) to one slot prior to extended pointer EP (N). That is, from the slot SLT X−3 to the slot SLT X−1.

Next, the controller 4 identifies the extended pointers indicating slots included in the range from the slot SLT X−3 to the slot SLT X−1 from among the extended pointers stored in the fetch command management table 464-$n$. This allows the controller 4 to identify that the commands corresponding to the second entry that stores the extended pointer EP(X−3) indicating the slot SLT X−3 and the third entry that stores the extended pointer EP(X−1) indicating the slot SLT X−1 are the commands of timeout target. Note that, in some cases, EP(N) may be later than the SQHP. In this case, the commands corresponding to the slots from the SQHP to one slot prior to EP(N) are also the commands of timeout target, therefore, are fetched and aborted immediately. This occurs in a case where the fetch command management table 464-*n* is in a full state, and the commands in the submission queue 221-*n* reach timeout without being able to be fetched. At this time, since the command in the fetch command management table 464-*n* is aborted first, there is space in the fetch command management table 464-*n*, so it is possible to newly fetch for abort processing.

On the other hand, when identifying the command of timeout target, the controller 4 may use the line numbers of the time slot number management table 471-*n* stored in the fetch command management table 464-*n*. In this case, when the controller 4 identifies that the time slot of timeout target is TSn, N, it identifies the entry that stores line number LN(N) corresponding to time slot TSn, N among the plurality of entries in the fetch command management table 464-*n*. Then, the controller 4 executes the timeout process for the command corresponding to the identified entry. In this manner, the controller 4 identifies the commands corresponding to the second entry and the third entry, which store line number LN(N), as the commands of timeout. Note that, in this case, in a case where EP(N) is later than the SQHP, it is still necessary to fetch and abort the commands stored in the slots from the SQHP to one slot prior to EP(N), as described above.

Next, control of timing of the timeout processes with respect to a plurality of submission queues will be described. FIG. 19 illustrates an example of the timing of the timeout processes in the memory system 3 according to the embodiment. Here, a case in which the timeout process is executed for each of the two submission queues of the submission queue 221-0 and the submission queue 221-1 is assumed.

First, each time time T0 elapses, the controller 4 determines whether or not any of the commands issued via the submission queue 221-0 are found as target of timeout.

Also, each time time T1 elapses, the controller 4 determines whether or not a command of timeout target exists among the commands issued via the submission queue 221-1.

Each of the times T0 and T1 is set as an integer multiple of a tick time Tc of the timer 43. For example, the controller 4 sets the time T0 to 2×Tc and the time T1 to 4×Tc. In this case, the controller 4 can make the frequency at which the timeout process for the submission queue 221-0 is executed twice as frequent as the frequency at which the timeout process for the submission queue 221-1 is executed. Furthermore, the length of the time slot in the submission queue 221-0 is half of the length of the time slot in the submission queue 221-1.

The controller 4 sets a timeout time TO0 of a command issued via the submission queue 221-0 to M0×T0, where M0 is, for example, an integer greater than or equal to one. Therefore, the timeout time TO0 is also an integer multiple of the tick time Tc. The controller 4 also sets a timeout time TO1 for a command issued via the submission queue 221-1 to M1×T1, where M1 is, for example, an integer greater than or equal to one. The timeout time TO1 is also an integer multiple of the tick time Tc.

The controller 4 may also shift the timing of starting calculations of the times T0 and T1 by a unit of Tc. For example, the controller 4 starts counting the time T1 in the submission queue 221-1 after Tc has elapsed since it started counting the time T0 in the submission queue 221-0. This allows the controller 4 to set the timeout process for the submission queue 221-0 and the timeout process for the submission queue 221-1 to be executed at different times.

FIG. 19 shows the timing of the timeout process in a case where the time T0 is set to 2×Tc and the time T1 to 4×Tc, with the time T0 starting at 0×Tc and the time T1 starting at 1×Tc.

For the submission queue 221-0, the time T0 starts counting at time 0×Tc. The controller 4 then executes the timeout process at times 2×Tc, 4×Tc, 6×Tc, 8×Tc, and 10×Tc.

For the submission queue 221-1, the time T1 starts counting at the time 1×Tc. The controller 4 then executes the timeout process at times 5×Tc and 9×Tc.

Thus, by setting different times T0, . . . , Tv for each of the plurality of submission queues 221-0, . . . , 221-*v*, the controller 4 can set a time interval for executing the timeout process for each submission queue. This allows the controller 4 to reduce the possibility of the timeout process for the plurality of submission queues being concentrated at the same time based on the set time.

Next, a flow of command process will be described. FIG. 20 is a sequence diagram illustrating an example of the command process procedure executed by the memory system 3 according to the embodiment and the host 2. Here, a case is assumed in which the host 2 and the memory system 3 transmit and receive commands and completion responses via the submission queue 221-*n* and the completion queue 222-*m*. The host 2 starts the command process in response to a command that is ready to be transmitted to the memory system 3.

First, the host 2 stores the prepared commands in the submission queue 221-*n* (step S101). At this time, the host 2 issues the commands by storing the commands in a slot indicated by the SQHTP 224-*n*.

The host 2 updates the SQHTP 224-*n*. (step S102). The host 2 then increments the SQHTP 224-*n* by the number of commands issued in S101.

The host 2 updates the SQTP 4111-*n*, which is the submission queue tail doorbell register (step S103). The host 2 sets the SQTP 4111-*n* to the value of the SQHTP 224-*n* updated in S102.

The memory system 3 updates the SQETP 463-*n* (step S104). In a case where the SQTP 4111-*n* updated in S103 is smaller than the SQTP 4111-*n* before the update, the memory system 3 increments the cycle counter included in the SQETP 463-*n* by one. Then, the memory system 3 updates the SQETP 463-*n* using the SQTP 4111-*n* updated in S103.

The memory system 3 fetches commands from the submission queue 221-*n* (step S105). Specifically, it reads the contents of the slot pointed to by the SQHP 461-*n*. The memory system 3 identifies the number of unfetched commands stored in the submission queue 221-*n* from the difference between the SQTP 4111-*n* updated in S103 and the SQHP 461-*n*. The number of invalid entries in the fetch command management table 464-*n* corresponding to the submission queue 221-*n* is also identified. In a case where the identified number of unfetched commands is greater than the number of invalid entries, the commands in the number of invalid entries are fetched; otherwise, the commands in the number of unfetched commands are fetched. Commands that cannot be fetched at this time are fetched after the invalid entries have occurred.

The memory system 3 updates the fetch command management table 464-$n$ to store information relating to the commands fetched in S105 (step S106). For example, the memory system 3 stores in the fetch command management table 464-$n$ the contents of the fetched commands, the ID of the submission queue 221-$n$ in which the fetched commands are stored, the CID described in the slots of the submission queue 221-$n$ in which the fetched commands are stored, and the extended pointers indicating the slots. Alternatively, instead of the extended pointers indicating the slots in the submission queue 221-$n$ in which the fetched commands are stored, information indicating the time slot corresponding to the fetched commands may be stored in the fetch command management table 464-$n$.

The memory system 3 updates the SQHP 461-$n$ (step S107). The memory system 3 increments the SQHP 461-$n$ by the number of commands fetched in S105.

The memory system 3 executes processing of the commands fetched in S105 (step S108).

When the command process being executed in S108 is completed, the memory system 3 issues to the host 2 a completion response corresponding to a command whose processing has been completed (step S109). The completion response includes the SQHP that has not yet been notified to the host 2 after the updated, the submission queue ID indicating the SQ corresponding to that the SQHP, the ID of the submission queue to which the command that was completed was issued, the CID and phase tag bit of that command. The memory system 3 stores the completion response in the completion queue 222-$m$ of the host 2.

The memory system 3 updates the CQTP 462-$m$ (step S110).

The memory system 3 updates the fetch command management table 464-$n$ (step S111). The memory system 3 invalidates the entry in the fetch command management table 464-$n$ corresponding to the command that has been processed.

The memory system 3 notifies the host 2 of an interrupt to notify that the completion response has been issued (step S112). The interrupt may include a completion queue ID indicating the completion queue 222-$m$ in which the completion response was stored in S111.

The host 2 processes the completion response in response to being notified of the interrupt in S112 (step S113). The host 2 executes processing of the completion response stored in the completion queue indicated by the completion queue ID included in the interrupt. In a case where the completion queue ID is not included in the interrupt, a completion queue that is not free is identified from the phase tag bit value and the CQHHP value, the updated entry in that queue is processed, and the completion response is executed. The command prepared in step S101 can be identified from the submission queue ID and CID to which the command was issued, which are included in the response completion, and the completion processing of the prepared command is performed.

The host 2 updates the SQHHP managed by the host 2 based on the submission queue ID and SQHP included in the completion response processed in S113 (step S114). The host 2 updates the SQHHP to the value of the SQHP included in the completion response.

The host 2 updates the CQHHP 225-$m$ (step S115). The host 2 increments the CQHHP 225-$m$ based on the number of completion responses processed in S113.

The host 2 updates the CQHP 4112-$m$ by performing write access to the completion queue head doorbell register in the memory system 3 (step S116). The host 2 updates the CQHP 4112-$m$ to the CQHHP 225-$m$ updated in S115.

Figure 21:
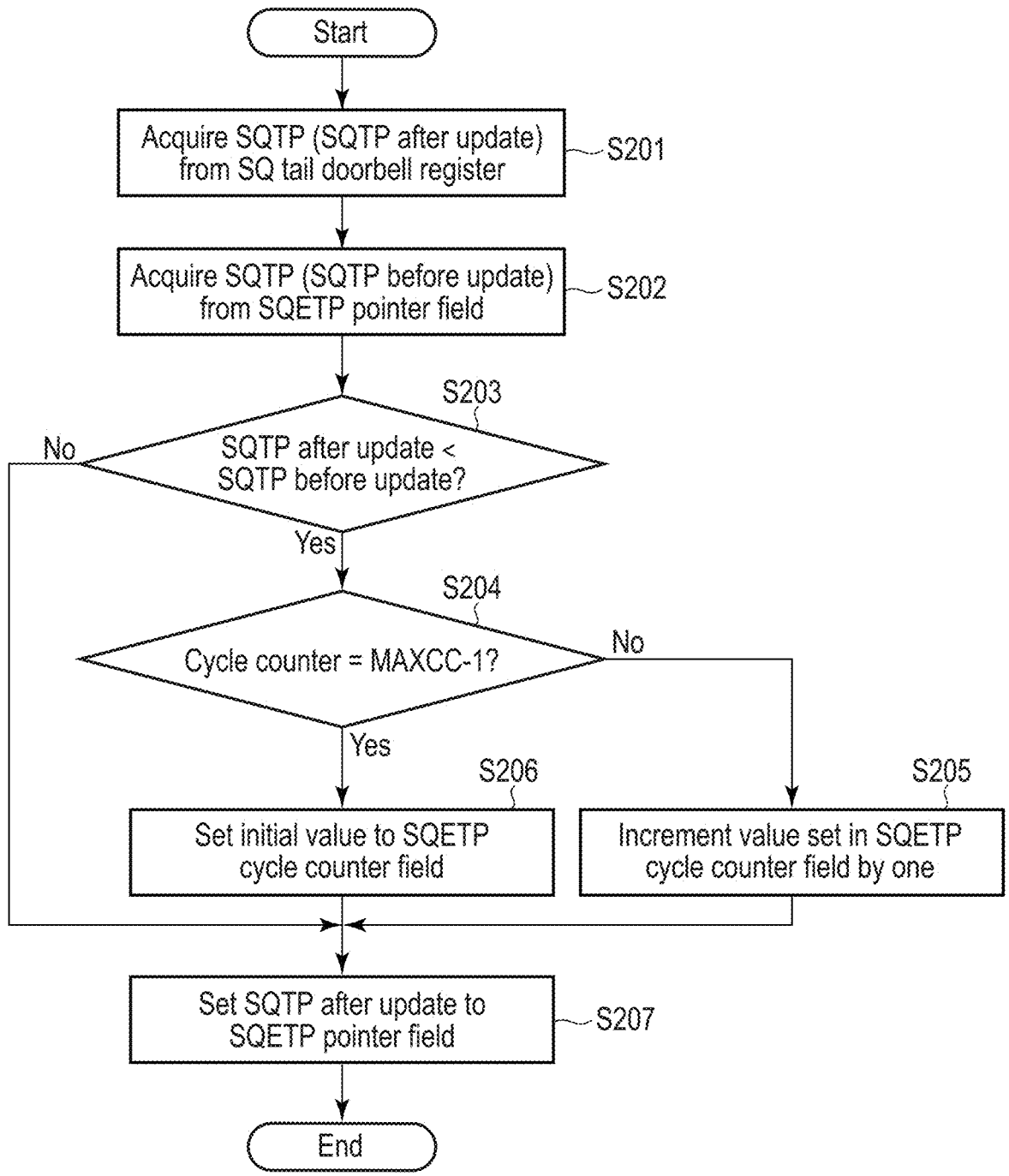
FIG. 21 is a flowchart illustrating an example of the procedure of an update process of a submission queue extended tail pointer executed in the memory system according to the embodiment.

Next, update process of the submission queue extended tail pointer (SQETP) will be described. FIG. 21 is a flowchart illustrating an example of the procedure of the update processing of the submission queue extended tail pointer executed in the memory system 3 according to the embodiment. Here, a case is assumed in which a command is issued from the host 2 to the controller 4 of the memory system 3 via the submission queue 221-$n$. The controller 4 starts the update processing of the SQETP 463-$n$ in response to the SQTP 4111-$n$ stored in the submission queue tail doorbell register being updated to a new value by the host 2.

The controller 4 acquires the SQTP 4111-$n$ (hereinafter referred to as the SQTP 4111-$n$ after update) from the SQ tail doorbell register (step S201).

The controller 4 acquires the SQTP (hereinafter referred to as the SQTP before update) from the pointer field of the SQETP 463-$n$ (step S202).

The controller 4 determines whether or not the value of the SQTP 4111-$n$ after update acquired in S201 is smaller than the value of the SQTP before update acquired in S202 (step S203). As a result, the controller 4 determines whether or not the pointer value has cycled from the value indicating the last slot of the submission queue 221-$n$ to the value indicating the first slot in the current update of the SQTP 4111-$n$.

In a case where the value of the SQTP 4111-$n$ after update acquired in S201 is smaller than the value of the SQTP before update acquired in S202 (Yes in S203), the controller 4 determines whether or not the cycle counter is equal to the upper limit value (MAXCC−1) (step S204). This cycle counter is a value set in the cycle counter field of the SQETP 463-$n$.

In a case where the cycle counter is not at the upper limit value (No in S204), the controller 4 increments the value set in the cycle counter field of the SQETP 463-$n$ by one (step S205).

In a case where the cycle counter is at the upper limit value (Yes in S204), the controller 4 sets the value in the cycle counter field of the SQETP 463-$n$ to an initial value (step S206).

Then, the controller 4 sets the value of the pointer field of the SQETP 463-$n$ to the value of the SQTP 4111-$n$ after update (step S207), and ends the update processing of the SQETP.

In a case where the value of the SQTP 4111-$n$ after update acquired in S201 is greater than or equal to the value of the SQTP 4111-$n$ before update acquired in S202 (No in S203), the controller 4 skips the procedures from S204 to S206, sets the value of the pointer field of the SQETP 463-$n$ to the value of the SQTP 4111-$n$ after update (step S207), and ends the update processing of the SQETP 463-$n$.

Thus, the controller 4 updates the SQETP 463-$n$, including the cycle counter in response to the SQTP 4111-$n$ being updated by the host 2.

Figure 22:
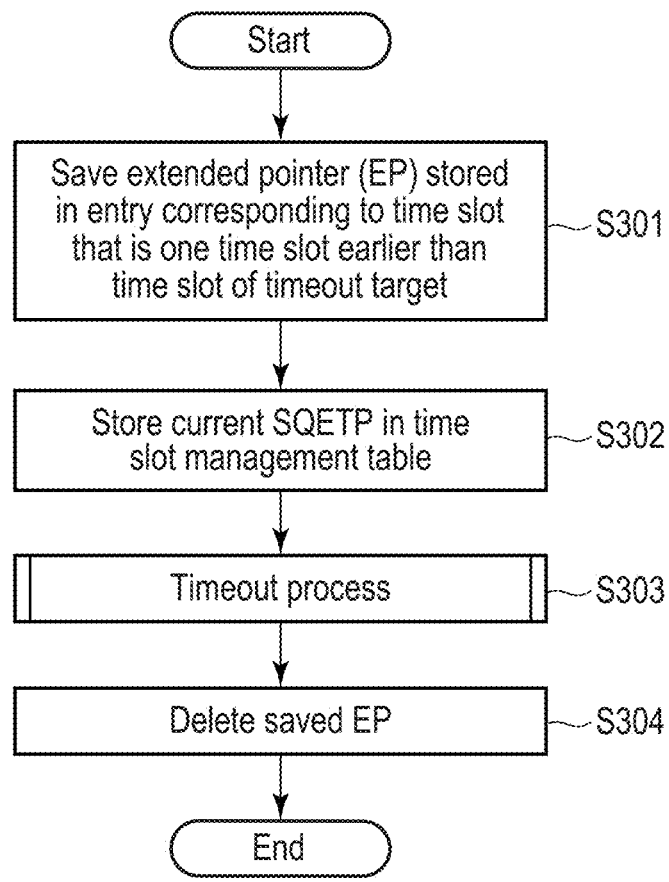
FIG. 22 is a flowchart illustrating an example of the procedure of a process of storing the submission queue extended tail pointer executed in the memory system according to the embodiment.

Next, update processing of the time slot management table, including the timeout process, will be described. FIG. 22 is a flowchart illustrating a procedure of a processing for storing the submission queue extended tail pointer executed in the memory system 3 according to the embodiment. Here, the update processing of the time slot management table 471-$n$ corresponding to the submission queue 221-$n$ is described. At this time, a case is assumed in which the current time is a time equal to or longer than the elapse of the timeout time TOn since information relating to the first time slot was stored in the entry of time slot management table 471-$n$. The number of a plurality of entries included in the time slot management table 471-$n$ is Mn+1, and the timeout time TOn is Tn×Mn. Here, the controller 4 starts updating operation of the time slot management table 471-$n$ each time Tn elapses.

The controller 4 saves the extended pointer (EP) stored in the entry corresponding to the time slot that is one time slot earlier than the time slot of timeout target to the first EP 465-$n$ in the SRAM 46 (step S301). Since the number of the plurality of entries in time slot management table 471-$n$ is Mn+1, the next entry to be updated is the entry corresponding to the time slot that is one time slot earlier than the time slot of timeout target. In other words, the controller 4 saves the EP stored in the entry to be updated next to the first EP 465-$n$ in the SRAM 46. In a case where the time slot of timeout target is the first time slot, the EP to be saved indicates an initial value.

The controller 4 stores the current SQETP 463-$n$ in the time slot management table 471-$n$ (step S302). The controller 4 stores the current SQETP 463-$n$ in the entry in which the EP was saved in S301.

The controller 4 executes the timeout process (step S303). Examples of the specific procedures of the timeout process are described below with reference to FIG. 23 and FIG. 24.

The controller 4 deletes the EP saved in S301 (step S304).

In this manner, the controller 4 stores the SQETP 461-$n$ corresponding to the submission queue 221-$n$ in the time slot management table 471-$n$ each time Tn elapses. This allows the controller 4 to store the SQETP 463-$n$ at the end time of each time slot corresponding to the submission queue 221-$n$.

Next, the timeout process executed in S303 of FIG. 22 in a case where the extended pointer is stored in the fetch command management table will be described. FIG. 23 is a flowchart illustrating a first example of a procedure of the timeout process executed in the memory system 3 according to the embodiment.

The controller 4 acquires the EP (first EP 465-$n$) saved in S301 of FIG. 22 from the SRAM 46 (step S401). The first EP 465-$n$ is the SQETP 463-$n$ at the end time of the time slot that is one time slot earlier than the time slot of timeout target, or the initial value.

The controller 4 acquires the EP corresponding to the time slot of timeout target (second EP) from time slot management table 471-$n$ (step S402). The second EP is the SQETP 463-$n$ at the end time of the time slot of timeout target.

The controller 4 determines whether or not the first EP 465-$n$ acquired in S401 and the second EP acquired in S402 match (step S403).

In a case where the first EP 465-$n$ and the second EP match (Yes in S403), the controller 4 determines that there is no command corresponding to the time slot of timeout target and ends the timeout process.

In a case where the first EP 465-$n$ and the second EP do not match (No in S403), the controller 4 determines whether or not there is a command associated with an EP included in the range from the first EP 465-$n$ to EP that is one EP before the second EP in the fetch command management table 464-$n$ (step S404).

In a case where there is a command associated with an EP included in the range from the first EP 465-$n$ to one EP prior to the second EP in the fetch command management table 464-$n$ (Yes in S404), the controller 4 aborts the found command (step S405). The controller 4 interrupts processing corresponding to the command and issues a completion response corresponding to the command to the host 2. The issued completion response includes information indicating that the found command has been aborted.

The controller 4 updates the fetch command management table 464-$n$ to invalidate the entry corresponding to the command aborted in S405 (step S406).

In a case where there are no commands in the fetch command management table 464-$n$ associated with EPs in the range from the first EP 465-$n$ to one EP prior to the second EP (No in S404), the controller 4 skips the procedures of S405 and S406.

Then, the controller 4 determines whether or not the second EP is a greater value than the EP corresponding to the current SQHP 461-$n$ (step S407).

In a case where the second EP is greater than the EP corresponding to the current SQHP 461-$n$ (Yes in S407), the controller 4 determines that a command of timeout target is stored in the submission queue 221-$n$. Then, the controller 4 fetches the command of timeout target from the submission queue 221-$n$ (step S408). The controller 4 aborts the command fetched in S408 (step S409). The controller 4 issues a completion response corresponding to the command fetched in S408 to the host 2. The issued completion response includes information indicating that the command fetched in S408 has been aborted.

In a case where the second EP is less than or equal to the EP corresponding to the current SQHP 461-$n$ (No in step S407), the controller 4 ends the timeout process.

Thus, the controller 4 can identify the command for target of the timeout process by using the extended pointer stored in the time slot management table 471-$n$ and the extended pointer stored in the fetch command management table 464-$n$. The controller 4 can then collectively abort the commands corresponding to the time slots of timeout target.

Figure 24:
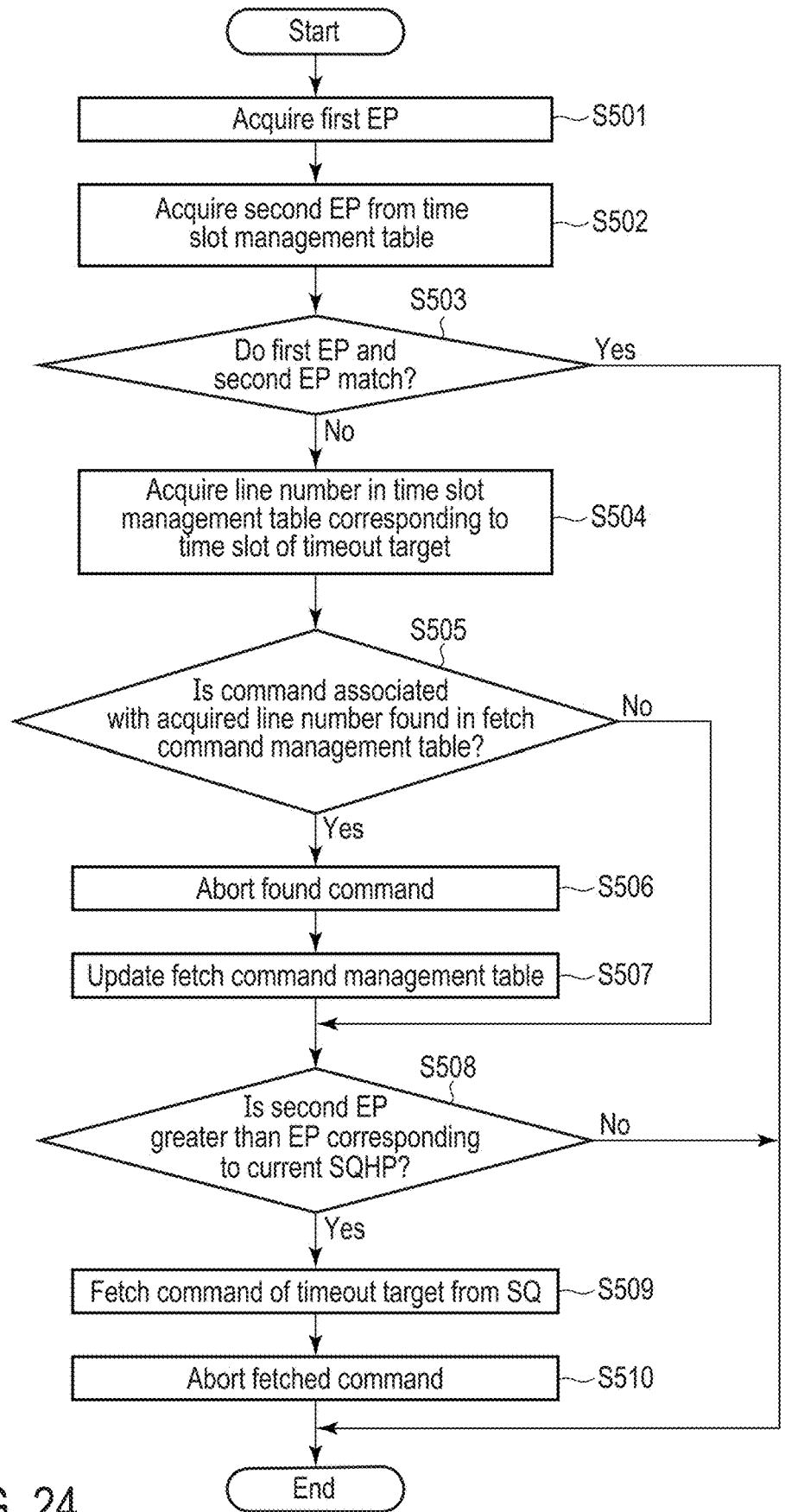
FIG. 24 is a flowchart illustrating a second example of the procedure of the timeout process executed in the memory system according to the embodiment.

Next, the timeout process executed in S303 of FIG. 22 in a case where information indicating the time slot is stored in the fetch command management table is described. FIG. 24 is a flowchart illustrating a second example of a procedure of the timeout process procedure executed in the memory system 3 according to the embodiment. Here, a case is assumed in which the fetch command management table stores the line number of the time slot management table as information indicating the time slot.

The controller 4 acquires the first EP 465-$n$ saved in S301 of FIG. 22 from the SRAM 46 (step S501). The first EP 465-$n$ is the SQETP 463-$n$ at the end time of the time slot that is one time slot earlier than the time slot of timeout target, or the initial value.

The controller 4 acquires the second EP from time slot management table 471-$n$ (step S502). The second EP is the SQETP 463-$n$ at the end time of the time slot of timeout target.

The controller 4 determines whether or not the first EP 465-$n$ acquired in S501 and the second EP acquired in S502 match (step S503).

In a case where the first EP 465-$n$ and the second EP match (Yes in S503), the controller 4 determines that there is no command corresponding to the time slot of timeout target and ends the timeout process.

In a case where the first EP 465-$n$ and the second EP do not match (No in S503), the controller 4 acquires the line number in the time slot management table 471-$n$ corresponding to the time slot of timeout target (step S504).

The controller 4 determines whether or not there is a command associated with the line number acquired in S504 in fetch command management table 464-$n$ (step S505).

In a case where there is a command associated with the line number acquired in S504 (Yes in S505), the controller 4 aborts the found command (step S506). The controller 4 interrupts processing corresponding to the command and issues a completion response corresponding to that command to the host 2. The issued completion response includes information indicating that the found command has been aborted. Then, the controller 4 updates the fetch command management table 464-n to invalidate the entry corresponding to the command aborted in S506 (step S507).

In a case where there is no command associated with the line number acquired in S504 (No in S505), the controller 4 skips the procedures of S506 and S507.

Then, the controller 4 determines whether or not the second EP is greater than the EP corresponding to the current SQHP 461-n (step S508).

In a case where the second EP is greater than the EP corresponding to the current SQHP 461-n (Yes in S508), the controller 4 determines that a command of timeout target is stored in the submission queue 221-n. Then, the controller 4 fetches the command of timeout target from the submission queue 221-n (step S509).

The controller 4 aborts the command fetched in S408 (step S510). The controller 4 issues a completion response corresponding to the command fetched in S408 to the host 2. The issued completion response includes information indicating that the command fetched in S408 has been aborted.

In a case where the second EP is less than or equal to the EP corresponding to the current SQHP 4111-n (No in step S508), the controller 4 ends the timeout process.

Thus, the controller 4 can identify the command for target of the timeout process using the line numbers of the time slot management table 471-n stored in the fetch command management table 464-n. The controller 4 can then collectively abort the commands corresponding to the time slots of timeout target.

As described above, in the memory system 3 according to the embodiment, the controller 4 groups the issued commands in units of time slots. Then, the controller 4 identifies the time slot of timeout target, identifies the commands stored in the submission queue during the identified time slot, and executes the timeout process to abort the identified commands.

This eliminates the need for the controller 4 to manage the time elapsed since each issued command was stored in the submission queue.

The controller 4 also manages the extended pointer to identify each command issued during the time slot of timeout target. The extended pointer is a pointer that can identify each command that may be issued until the timeout time elapses.

The extended pointer includes a pointer indicating one of a plurality of slots in the submission queue and a cycle counter corresponding to the number of times the pointer has cycled the slot in the submission queue. The cycle counter control circuit 45 of the controller 4 updates the cycle counter in a case where the updated SQTP is a smaller value than the SQTP before the update.

When the SQTP is one value before the SQHP corresponding to the same submission queue, this submission queue is determined to be in a full state. Therefore, the host 2 cannot update the SQTP to overtake the SQHP.

In addition, the SQHHP managed by the host 2 is updated based on the value of the SQHP included in the completion response issued by the controller 4. The host 2 can store commands in the slots of the submission queue until the value indicated by the SQTP reaches the slot that is one slot prior to the slot indicated by this updated SQHP.

Thus, the maximum value that the host 2 can increment the SQTP with a single write access is the size of the submission queue −1. Therefore, in the case where the SQETP is updated when the SQTP is updated, updating of the cycle counter cannot be omitted.

The controller 4 manages the time slots corresponding to each of the plurality of issued commands. For example, in a case where the time slots corresponding to each of the plurality of issued commands were stored directly, it would be necessary to store information indicating the time slots for the number of slots in the virtual submission queue, which would consume significant resources of the volatile memory (e.g., the SRAM 46) in the memory system 3. The amount of resources consumed depends on the size of the submission queue and the upper limit value of the cycle counter, and the larger the size of the submission queue, the larger the amount of resources consumed.

However, as in the memory system 3 according to the embodiment, in the case where the extended pointer and the time slot management table 471-n are used to manage the time slots corresponding to the plurality of issued commands, the number of lines of entries required in the time slot management table 471-n corresponds to the number of time slots. The number of time slots is a very small number compared to the number of slots in the virtual submission queue. Therefore, the memory system 3 according to the embodiment can reduce the memory resources required for the timeout process by using the extended pointer and the time slot management table 471-n.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to an external host, comprising:
 a memory; and
 a controller configured to control the memory, wherein
 the controller is capable of executing processes in accordance with commands received from the host through a first queue, the first queue includes a plurality of slots that are capable of storing the received commands, and
 the controller is configured to:
 manage a current extended pointer that includes a pointer and a cycle counter, the pointer indicating a current slot among the plurality of slots in which a command is to be stored next, the cycle counter being updated in response to a current value of the pointer being updated with a value smaller than the current value;
 manage a first table that includes a plurality of entries, each of which corresponds to a time range among a plurality of contiguous time ranges having a first time as a unit;
 select an entry from the plurality of entries for each time the first time elapses;
 store, in the selected entry, the current extended pointer;
 identify, for each time the first time elapses, a first time range whose end time matches a time that is prior to a specific time from a current time;

acquire a first extended pointer stored in a first entry among the plurality of entries that corresponds to the first time range;
identify one or more commands stored in the first queue within the first time range by using the first extended pointer; and
abort the identified one or more commands.

2. The memory system of claim 1, wherein
the controller is configured to:
further identify a second time range that is one-range before the first time range;
acquire a second extended pointer stored in a second entry among the plurality of entries that corresponds to the second time range;
in a case where the first extended pointer is identical with the second extended pointer, skip a timeout process that includes a process of identifying one or more commands stored in the first queue within the first time range and aborting the identified one or more commands; and
in a case where the first extended pointer and the second extended pointer are different, execute the timeout process by using the first extended pointer and the second extended pointer.

3. The memory system of claim 2, wherein
the controller is configured to:
when fetching a first command from the first queue,
store contents of the first command and an extended pointer corresponding to the first command in one of a plurality of entries in a second table, the extended pointer including a cycle counter for when the first command is fetched and the pointer indicating a slot in the first queue in which the first command was stored;
each time the first time elapses,
determine whether or not the plurality of entries in the second table include one or more entries that store an extended pointer that is greater than or equal to the second extended pointer and is less than or equal to a third extended pointer, the second extended pointer corresponding to the second time range, the third extended pointer indicating a slot of the first queue that is one-slot before a slot indicated by the first extended pointer corresponding to the first time range; and
abort one or more commands corresponding to the one or more entries.

4. The memory system according to claim 2, wherein
the controller is configured to:
when fetching a first command from the first queue,
store, in one of a plurality of entries in the second table, contents of the first command and information indicating the time range that includes a time when the first command was stored in the first queue; and
each time the first time elapses,
determine whether or not the plurality of entries in the second table include one or more entries that store information indicating the first time range; and
abort one or more commands corresponding to the one or more entries.

5. The memory system of claim 3, wherein
the controller is configured to:
in a case where one or more second commands of the one or more identified commands are stored in the first queue and have not been processed,
interrupt processes of the second commands;
transmit, to the host, a first completion response that indicates that the processes of the second commands have failed; and
invalidate entries corresponding to the second commands among the plurality of entries in the second table; and
in a case where one or more third commands of the one or more identified commands are stored in the first queue,
fetch the third commands; and
without processing the third commands, transmit, to the host, a second completion response indicating that the processes of the third commands have failed.

6. The memory system of claim 1, wherein
the controller is configured to:
when the current value of the pointer indicating a slot among the plurality of slots in which the command is to be stored next is updated with the value smaller than the current value,
determine whether or not a value of the cycle counter is an upper limit value;
in a case where the value of the cycle counter is not the upper limit value, increment the cycle counter by one; and
in a case where the value of the cycle counter is the upper limit value, update the cycle counter with an initial value.

7. The memory system of claim 6, wherein
the upper limit value of the cycle counter is determined based on at least one of a number of the plurality of slots, the specific time, and a number of commands that the controller can process during elapse of the specific time.

8. The memory system of claim 3, wherein
the controller is configured to, in response to completion of a process of the fetched first command, invalidate an entry corresponding to the first command among the plurality of entries in the second table.

9. The memory system of claim 2, wherein
the controller that receives a command from the host through the first queue or a second queue is configured to:
manage the first time corresponding to the first queue and a second time corresponding to the second queue;
execute a timeout process for a command received through the first queue each time the first time elapses; and
execute the timeout process for a command received through the second queue each time the second time elapses.

10. The memory system of claim 9, wherein
the controller is configured to start calculating the second time after an integer multiple of a third time elapses from a time at which calculating the first time is started, and
each of the first time and the second time is an integer multiple of the third time.

11. The memory system of claim 1, wherein
the specific time is an integer multiple of the first time.

12. The memory system of claim 11, wherein
a number of the plurality of entries in the first table is equal to or greater than a number that is obtained by dividing the specific time by the first time and adding one.

13. The memory system of claim 11 further comprising a volatile memory, wherein
a number of the plurality of entries in the first table is equal to or greater than a number that is obtained by dividing the specific time by the first time and adding one, and
the controller is configured to, each time the first time elapses:
in a case where there is no free entries in the first table, save, in the volatile memory, a fourth extended pointer stored in a second entry of the plurality of entries in the first table, the second entry corresponding to a time range that is one-time range before the first time range; and
overwrite an entry corresponding to an earliest time range among the plurality of entries in the first table with a value of the current extended pointer.

14. The memory system of claim 13, wherein
the controller is configured to:
each time the first time elapses,
identify one or more commands stored in the first queue within the first time range by using the saved fourth extended pointer and a fifth extended pointer that is stored in the first entry corresponding to the first time range.

* * * * *